United States Patent
Cooley-White et al.

(10) Patent No.: US 12,450,903 B2
(45) Date of Patent: Oct. 21, 2025

(54) SYSTEMS AND METHODS FOR USER-GENERATED CONTENT WITH MACHINE-GENERATED METADATA

(71) Applicant: Microsoft Technology Licensing, LLC, Redmond, WA (US)

(72) Inventors: Donyea Durece Cooley-White, Seattle, WA (US); Daniel Ryan Howell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 687 days.

(21) Appl. No.: 17/716,879

(22) Filed: Apr. 8, 2022

(65) Prior Publication Data

US 2023/0326208 A1   Oct. 12, 2023

(51) Int. Cl.
*G06V 20/40* (2022.01)
*G06F 16/735* (2019.01)
*G06F 16/783* (2019.01)

(52) U.S. Cl.
CPC ............ *G06V 20/44* (2022.01); *G06F 16/735* (2019.01); *G06F 16/783* (2019.01); *G06V 20/46* (2022.01)

(58) Field of Classification Search
CPC ........ G06V 20/44; G06V 20/46; G06V 40/10; G06V 40/15; G06V 40/28; G06V 30/413; G06V 10/40; G06V 10/762; G06V 20/40; G06V 20/42; G06V 40/19; G06V 40/197; G06V 40/20; G06V 40/23; G06F 16/735; G06F 16/783; H04N 21/2743; H04N 21/44008; H04N 21/44226; H04N 21/4781; H04N 21/84; H04N 21/854; H04N 21/482; H04N 21/4886; H04N 21/2387; H04N 21/23617; H04N 21/2407; A63F 13/86; G06Q 50/01; G06Q 30/0282; G06Q 30/0255; G06Q 20/32; G06Q 20/384; G06Q 10/06; G06Q 20/325; G06Q 20/3255; G06Q 30/0267; H04W 4/80; H04W 4/50; H04W 4/029; H04W 4/21; H04W 4/06;
(Continued)

(56) References Cited

U.S. PATENT DOCUMENTS 9,266,017 B1 *   2/2016   Parker ..................... A63F 13/77
2009/0131177 A1 *   5/2009   Pearce .................... A63F 13/30
                                                                463/43

(Continued)

OTHER PUBLICATIONS

"Non Final Office Action Issued in U.S. Appl. No. 17/576,616", Mailed Date: Mar. 27, 2023, 18 Pages.
(Continued)

*Primary Examiner* — Nimesh Patel
(74) *Attorney, Agent, or Firm* — Ray Quinney & Nebeker P.C.; John O. Carpenter

(57) ABSTRACT

A method of assisting video information sharing includes, at a server computer, obtaining a comparison video including a plurality of frames from a social media platform and determining a presence of at least one event in the comparison video. The method further includes obtaining social media metrics for the comparison video from the social media platform and evaluating a description of the comparison video. The method further includes identifying at least one descriptor in the description correlated to the at least event in the comparison video and recording the descriptor in an application module.

20 Claims, 7 Drawing Sheets

(58) Field of Classification Search
CPC ......... G06T 11/001; G06T 7/00; G06T 19/20; G06T 2200/24; G06T 2207/10016; G06T 7/20; G06T 2207/30221; G06T 13/40; G06T 2219/2021; G06T 19/006; G06N 5/02; G06N 5/048; G06N 20/00; G06N 7/01; G06N 20/20; G06N 5/01; G06N 3/045; G06N 3/0895; G06N 3/096
See application file for complete search history.

(56) References Cited

U.S. PATENT DOCUMENTS

| | | | |
|---|---|---|---|
| 2012/0079020 A1* | 3/2012 | Park | H04L 51/52 709/204 |
| 2012/0209668 A1 | 8/2012 | Angelos et al. | |
| 2012/0320013 A1* | 12/2012 | Perez | H04N 9/8205 345/207 |
| 2014/0187323 A1* | 7/2014 | Perry | A63F 13/21 463/31 |
| 2014/0243098 A1 | 8/2014 | Yong et al. | |
| 2017/0106283 A1* | 4/2017 | Malyuk | A63F 13/49 |
| 2017/0344809 A1* | 11/2017 | Twyman | H04L 51/52 |
| 2021/0097168 A1* | 4/2021 | Patel | G06F 21/554 |
| 2021/0236944 A1 | 8/2021 | Summa et al. | |
| 2023/0232083 A1 | 7/2023 | Cooley-White et al. | |

OTHER PUBLICATIONS

Mahajan, et al., "Exploring the Limits of Weakly Supervised Pretraining", In Proceedings of the 15th European Conference on Computer Vision, Oct. 9, 2018, pp. 185-201.
"International Search Report and Written Opinion Issued in PCT Application No. PCT/US23/015331", Mailed Date: Jun. 21, 2023, 12 Pages.
Singh, et al., "Learning To Hash-Tag Videos With Tag2Vec", In Proceedings of the Tenth Indian Conference on Computer Vision, Graphics and Image Processing, Dec. 18, 2016, 8 Pages.
Soomro, et al., "UCF101: A Dataset of 101 Human Actions Classes from Videos in the Wild", In Repository of arXiv:1212.0402v1, Dec. 3, 2012, 7 Pages.
Ulges, "Learning Automatic Concept Detectors from Online Video", In Journal of Computer Vision and Image Understanding, vol. 114, Issue 4, Apr. 1, 2010, pp. 429-438.
Wei, et al., "Personalized Hashtag Recommendation for Micro-Videos", In Proceedings of the 27th ACM International Conference on Multimedia, Oct. 15, 2019, pp. 1446-1454.

* cited by examiner

SYSTEMS AND METHODS FOR USER-GENERATED CONTENT WITH MACHINE-GENERATED METADATA

BACKGROUND

Background and Relevant Art

Electronic games can be recorded for later viewing. The recorded and/or edited videos may be viewed for entertainment, education, training, coaching, or commentary. Some videos are edited for entertainment purposes and distributed on various websites. Emergent gameplay experiences can be shared to create and strengthen social experiences.

BRIEF SUMMARY

Electronic games are played competitively and recreationally both online and offline. In some embodiments, a system or method according to the present disclosure provides for a more efficient querying and editing process for users based on objects and elements identified in the video information. After events, objects, and elements are identified, a system or method may prompt the user to record or share a recording of the events on social media. In some embodiments, the objects and elements are identified by a machine learning (ML) model or system that is configured for classification or identification of game events such as user interface elements, user interface animations or actions, user avatar appearance, user avatar animations or actions, game environment objects, game environment animations or actions, or other visual elements rendered by the game application for presentation to a user. In some embodiments, the system or method provides or suggests a title, description, or hashtag information to facilitate greater engagement or identification of the generated content on a social media platform.

In some embodiments, a method of assisting video information sharing includes, at a server computer, obtaining a comparison video including a plurality of frames from a social media platform and determining a presence of at least one event in the comparison video. The method further includes obtaining social media metrics for the comparison video from the social media platform and evaluating a description of the comparison video. The method further includes identifying at least one descriptor in the description correlated to the at least event in the comparison video and recording the descriptor in an application module.

In some embodiments, a method of assisting video information sharing includes obtaining a plurality of descriptors, where each descriptor of the plurality of descriptors is correlated with at least one object or event, and evaluating video information for detected objects and/or events. The method further includes comparing the detected objects and/or events of the video information to the plurality of descriptors. The method further includes preparing the video information for sharing to a social media platform and suggesting at least one descriptor for the video information based at least partially on the detected object and/or events of the video information.

In some embodiments, a method of assisting video information sharing includes obtaining a comparison video including a plurality of frames from a social media platform and determining a presence of at least one event in the comparison video. The method further includes obtaining social media metrics for the comparison video from the social media platform, determining at least one descriptor correlated to the at least one event, and assigning a social media value to the at least one descriptor based at least partially on the social media metrics. The method further includes obtaining a user's gameplay including a plurality of frames, determining a presence of the at least one event in the user's gameplay, and presenting to the user a suggested description for the user's gameplay including the at least one descriptor based at least partially on the social media value of the at least one descriptor.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
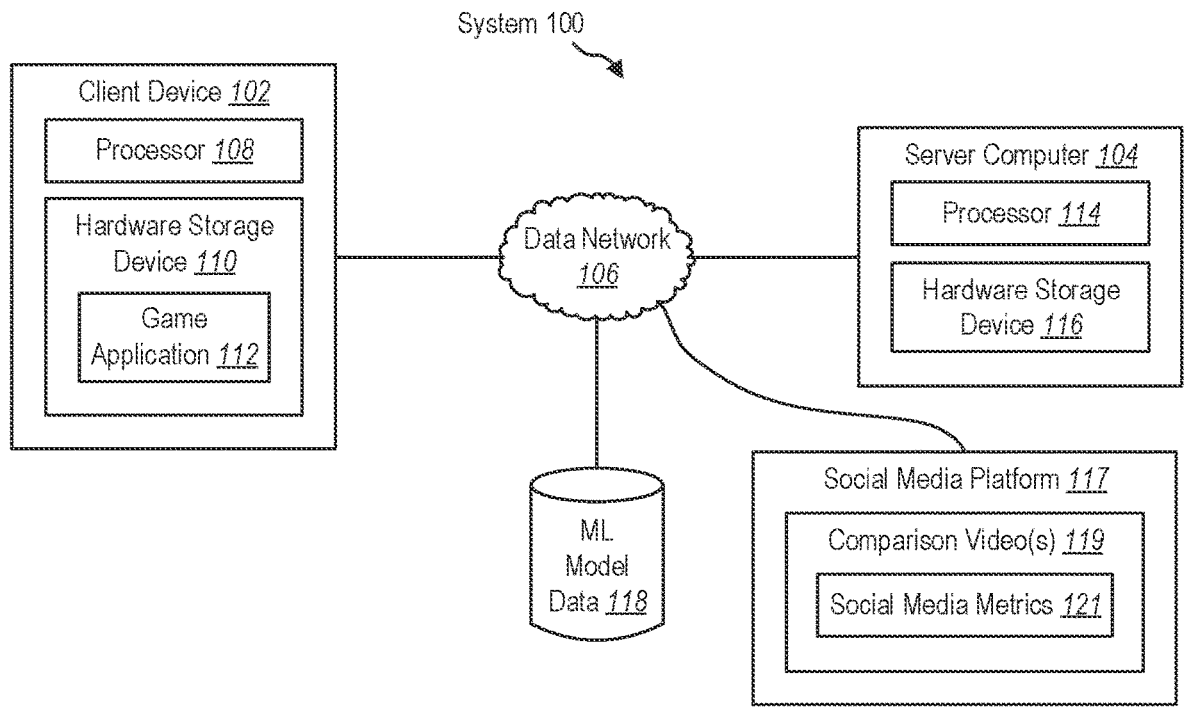
FIG. 1 is a schematic representation of a system for presenting video information from an electronic game to a user, according to at least some embodiments of the present disclosure.

The present disclosure relates generally to systems and methods for improving social sharing of video information produced by a game application or other video information. Systems and methods described herein provide automatic detection and identification of objects and elements in gameplay video information in electronic gaming. In some examples, a streaming content creator, a speedrunner, a casual player, or a competitive player may play, stream, and/or record many hours of gameplay per day. In some embodiments of systems and methods according to the present disclosure, video information of the user's gameplay is evaluated to detect objects and events using machine vision. In some embodiments, a machine learning (ML) system evaluates the video information of the user's gameplay with the machine vision system in addition to evaluating associated audio information, game state data, user inputs, or combinations thereof of the user's gameplay to detect events and/or objects in user's gameplay. The detected objects and events are then identified and/or classified to allow suggestions of descriptions or descriptors of the user's gameplay.

In some embodiments, the suggested descriptions or descriptors are based at least partially upon a database of predetermined terminology associated with the identified and/or detected events and/or objects. By using terminology that efficiently, accurately, and precisely describes the identified and/or detected events and/or objects of the shared content, the visibility and/or searching of the content may be improved. In some embodiments, the suggested descriptions or descriptors are based at least partially upon the descriptions or descriptors of other streams, recordings, screen captures, or other gameplay ("comparison video") from the same or different users. By using consistent terminology for the descriptions or descriptors within a community of users, the visibility and/or searching of the content may be improved.

In some embodiments, the comparison video is obtained from information posted on a social media platform. The comparison video is evaluated to determine social media metrics of the comparison video, such as views, likes, shares, comments, replies, saves, recordings, and other social media metrics (both total and relative to a given time period) to determine the performance of the comparison video on the social media platform(s). The descriptions or descriptors of the comparison video may be parsed to determine the terminology used in association with the content of the comparison video. In some embodiments, the social media metrics of the comparison video(s) are used to weight the descriptions or descriptors associated with the comparison video to allow a prediction of a performance and/or engagement of the user's video on the same or similar social media platform using the same or similar descriptions or descriptors.

For example, views can indicate the number of times the comparison video is watched or the number of unique users that viewed the comparison video. In some examples, likes indicate the number of users that viewed the comparison video and found the comparison video interesting or entertaining enough to click and support the comparison video. Shares can indicate extended reach of the comparison video throughout the social media platform. Comments and replies to comments reflect a level of community engagement and conversation about the content of the comparison video. Recordings can include the number of times the entire or a portion of the comparison video is copied or clipped for distribution elsewhere, such as a viewer clipping a portion of a live stream or recorded comparison video. More viewers clipping the same portion of a live stream may indicate particular interest in specifically that portion of the comparison video.

The comparison video(s) may be evaluated for the presence of events and/or objects that are related to the social media metrics of the comparison video(s). Detection and identification of the same or similar events and/or objects in the user's video information can determine whether the user's video information contains the same or similar events and/or objects that indicate the user's gameplay will perform well (e.g., have relatively large quantities of views and/or engagement) on a social media platform. In some embodiments, systems and methods according to the present disclosure prompt or suggest to the user to screen capture, record, clip, or post the user's gameplay based at least partially on the comparison of the user's gameplay to the comparison video and social media metrics of the comparison video.

In some embodiments, a comparison video with high social media metrics is a better indicator of community engagement, recognition, and/or adoption of the terminology used in the descriptions or descriptors. For example, many terms for events or objects in a gameplay video may be created by the community. In some examples, an accepted and recognized community term for an event may be different than a term for the specific event in the game. In a particular example, the fighting game community (FGC) recognizes the term "Dragon Punch" and "Super" for certain categories of special attacks, irrespective of the precise terminology used for that game application. Content posted by a user may experience greater visibility and/or engagement when community terminology is used.

Additionally, a developer or publisher of a game may desire to additionally promote the visibility or adoption of game-specific terminology. Suggested descriptions or descriptors may be provided to a user to additionally or alternatively promote terminology that is more accurate or precise to a particular game application than the community terminology. For example, a community term within a genre may be imprecise when applied to a specific game application, and suggested descriptions or descriptors may provide greater precision than a community term. In a particular example, within the Souls-like genre the term "Bonfire" has been accepted as a community term for any save point, while the precise term for a save point within another game in the genre may be "Meditation point" or "Site of Grace". Suggesting one or both of the community term and game-specific term for the content descriptions or descriptors may provide greater visibility, recognition, or searching for the content and the terminology.

In some embodiments, the user's gameplay is evaluated (e.g., object and/or events detected and/or identified) in real-time during interactive gameplay. For example, the user's gameplay may be evaluated by a client-side service that evaluates the user's gameplay on the same computing device (such as a personal computer or video game console) that is executing the game application. In another example, the user's gameplay may be evaluated by a server-side service that is in data communication with the computing device that is executing the game application. In at least one example, the user's gameplay may be evaluated by a server-side service and the game application may be streamed to the user from a cloud computing service. In other words, both the game application and the evaluation service may be remote to the user.

The user may receive prompts during gameplay in real-time that an event or object is detected in the user's gameplay that has a social media performance prediction or rating above a threshold value. For example, systems and methods according to the present disclosure may periodically and/or substantially continuously evaluate social media posts for comparison videos, and the evaluation system or service may notify a user when a similar event or object is identified in the user's gameplay. In some embodiments, the user is presented with an option to record and/or post the identified event. In some embodiments, a video clip, screen capture, or recording is automatically saved, and the user is notified and/or prompted to post the saved video clip, screen capture, or recording.

In some embodiments, the user's gameplay is recorded and subsequently evaluated (e.g., object and/or events detected and/or identified). For example, the user's gameplay may be evaluated by a local software application that obtains and evaluates a recording of the user's gameplay. In another example, the user's gameplay may be evaluated by a server-side service that is in data communication with a computing device having a recording of the user's gameplay stored thereon. In at least one example, the user's gameplay may be evaluated by a server-side service and the game application may be recorded from a cloud computing service.

Upon subsequent evaluation of the recorded user's gameplay, any events and/or objects identified that are similar to events and/or objects of comparison videos and/or have a social media performance prediction or rating above a threshold value are surfaced to the user. In some embodiments, the user is presented with an option to record and/or post the identified event. In some embodiments, a video clip, screen capture, or recording is automatically saved, and the user is notified and/or prompted to post the saved video clip, screen capture, or recording.

In some embodiments, the detection and identification of events is assisted by the machine vision and/or machine learning (ML) system invoking an application module. In some embodiments, the application module is created by a machine learning system through training datasets. For example, a machine learning system may evaluate many events to determine correlations between events across many video streams or recordings. In some embodiments, the application module is a predetermined application module based on the game engine of the game application to inform the system what events, objects, or animations are rendered in the game engine. For example, the application module may provide an example user avatar model, object textures, weapon models, health pack models, victory animations, user interface information, etc.

The application module may be specific to the game application, as the art style, animation style, or textures used in a first game application can be very different from a different game application. Furthermore, storing all possible textures, models, animations, and events for a plurality of game applications in memory and searching for those objects and events in the video information may be inefficient, when the video information may only include video information from a single game application at a time. In at least one example, a competitive electronic game player may practice the electronic game League of Legends for 8-10 hours in a day, while recording the video information from the practice session. It is more efficient to invoke an application module for League of Legends, specifically, when evaluating and querying the video information later, as compared to attempting to detect and identify objects and events using machine vision data also including textures, models, animations, and events encompassing other games such as Fortnite, Super Smash Bros., Street Fighter, and Forza Motorsport.

In some embodiments, the application module may include or assist a machine vision system in identifying graphical textures in the video information provided from the client device. In some embodiments, the application module includes game characteristics specific to the game application being run by the client device. In some embodiments, the game characteristics include textures, models, animations, UI elements, sounds, or other visual or audible features from the game. For example, the application module may include texture files that provide a unique texture that is used in the game to skin a particular item in the game environment. In at least one example, a boss character at the end of a level in the game environment may have a unique appearance in the game, and the machine vision system may access the application module to identify the character or event based on the texture used to skin the model. In some examples, a level or area of the game environment may include a unique texture or combination of textures on surfaces in the game environment. For example, a particular castle level may use a unique texture for the stone walls of the castle, allowing the machine vision system to identify portions of the video information when the playing user is within that portion of the game environment.

In some embodiments, the application module includes a model or sprite that is used in the game environment to depict a particular character or class of characters. The application module can include both volumetric models used to depict a three-dimensional avatar or object in the game environment, a three-dimensional skeleton model used to provide proportions over which a volumetric model is positioned and animated, two-dimensional sprites or skeletons, or combinations thereof. The models can allow the machine vision system to more readily detect and/or identify objects and avatars in the video information depicting the game environment.

In some embodiments, the application module includes animation information allows the machine vision system to identify common movements in the video information depicting the game environment. For example, some games allow customization of user avatars, which allow each user avatar to include different textures, sizes, proportions, or other variations to their appearance in the game environment. Some animations, such as emotes, attacks, or jump animations may produce similar movements of objects or portions of the avatar relative to one another. In at least one example, Fortnite includes a variety of dance animations that, while performable by avatars using different sizes, proportions, colors, textures, models, equipable cosmetic objects, or even representing species, move the avatars' limbs relative to the body in the same manner. The resulting animation may be recognized by the machine vision system independently of the model or textures used to represent the animation in the video information depicting the game environment.

User interface (UI) elements are present on the video information independently of the objects, perspective, or actions occurring in the game environment. In some embodiments, the application module includes UI elements that the machine vision system uses to interpret information provided by the UI to the user. For example, the UI elements can provide various information about the status of the game or game environment, such as user avatar information, game time information, team information, score, health, mana, lives, eliminations, equipment, powerups, abilities, cooldowns, etc. The UI elements can allow the machine vision to identify different stages or sections of a gameplay session in the video information. In some embodiments, optical character recognition allows the machine vision to identify specific characters, numbers, values, words, or other notifications in the user interface.

In some embodiments, a ML model or system communicating with the machine vision system can interpret the detected textures, models, animations, or combinations thereof as various events in a gameplay session to be surfaced to a viewer of the video information. For example, an enemy elimination event may be detected by a UI element incrementing, by an elimination animation detected in the user avatar, an elimination animation detected in an opposing avatar, by a splash screen or UI banner element announcing the elimination, or by other visual cues. The detection of at least one of the foregoing may allow the system to identify the event as an elimination event.

Some embodiments of systems and methods according to the present disclosure may access the application module to identify key events in the video information depicting a game environment and/or a gameplay session to be surfaced to a viewer of the video information. In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience.

While some embodiments of systems and methods for present video information to a user evaluate only video information, some embodiments evaluate other forms of information or data to supplement the video information. In some embodiments, the video information obtained from a client device further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information obtained from the client device includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, the application module includes information related to at least one of key events, popular events, rare events, exploit events, or other virtual objects in the game application. The ML system can evaluate comparison videos obtained from one or more social media platforms to associate a social media performance ratings with one or more of the key events, popular events, rare events, exploit events, or other virtual objects in the game application. In some embodiments, the social media performance ratings are periodically or substantially continuously updated based on the performance of recordings, streams, screen captures, or other video information on the social media platform(s). For example, the social media performance ratings may be updated periodically or substantially continuously based on the most viewed clips for the associated game application within a particular time period (i.e., trending posts). In a first example, the social media performance ratings are updated daily based on the 50 most viewed clips for the associated game application posted or uploaded within the previous 24 hours. In a second example, the social media performance ratings are updated substantially continuously based on the 500 most viewed clips for the associated game application posted or uploaded within the previous week. In a third example, the social media performance ratings are updated weekly based on the 1000 most viewed clips for the associated game application posted or uploaded within the previous month.

In some embodiments, an ML system may allow for the development of an application module for unknown game applications and/or the refinement of application modules for known game applications. For example, while an application module may be provided for a game application with a broad install base, some game applications may have a smaller install base and the creation of a dedicated or predetermined application module may not be desirable. In some embodiments, an existing application module may be refined over time using an ML model to update the application module or other ML model data with new strategies, new movesets, new characters, new stages, new items, or newly popularized techniques and strategies. For example, updates to existing game applications may utilize existing application modules for the UI elements, textures, models, and animations, along with existing key events, popular events, rare events, or combinations thereof while adding new content. The ML model allows the new content to be identified as new UI elements, textures, models, and animations. Upon detecting the new UI elements, textures, models, and animations repeatedly, the ML model may reclassify the detected new UI elements, textures, models, and animations as key events, popular events, rare events, etc. as those elements are detected more frequently and in particular contexts in the video information depicting the game environment.

Generally, systems and methods according to the present disclosure can assign social media performance ratings to the video information based on the presence and/or proximity of the detected and identified elements and the descriptions and/or descriptor associated with the detected and identified elements. In some embodiments, the key events are associated with tags and social media performance ratings that identify them as key events and associate the key event with any number of contextual tags. For example, an elimination banner in the UI may be detected by the machine vision and/or ML model of the system and identified as a key event. The key event is also assigned tags indicating that the key event is an opponent elimination, was performed with a sniper rifle, was performed while scoped, and was performed at 10 minutes and 31 seconds into the match. The events and/or tags may be associated with descriptions and/or descriptors correlated to the events and/or tags.

In some embodiments, each tag is assigned an associated social media performance rating. For example, the comparison video(s) may include a high number of elimination key events, but elimination key events using a particular weapon, at a particular location, against a particular opponent, etc. may be associated with a greater quantity of views and/or greater social media engagement. The tags and/or the specific variant of the elimination key event may have a greater social media performance rating assigned thereto than an elimination key event with other tags, weapon, location, opponent, etc.

The system and/or methods for evaluating the events and/or objects of the user's video information may further provide suggested descriptions and/or descriptors of events and/or objects detected in the video information. In some embodiments, the system and/or method suggests the descriptions and/or descriptors upon suggesting capturing the video information. In some embodiments, the system and/or method suggests the descriptions and/or descriptors upon the user choosing to share or post the video information as content to a social media platform.

In some embodiments, a description for the video information is at least part of a caption provided with the video information when shared or posted to a social media platform. In some embodiments, a description for the video information is at least part of metadata for the video information provided with the video information when shared or posted to a social media platform. In some embodiments, a description for the video information includes one or more descriptors. In some embodiments, a description for the video information is at least part of a text appended to or overlaid on the video information when shared or posted to a social media platform. For example, the description may be displayed in the frame of the video information during viewing by a viewer.

In some embodiments, a description includes one or more descriptors. A descriptor is a specific term that is related to an event or object in the video information. In some embodiments, the descriptor is associated with an object detected in the video information. In some embodiments, the descriptor is associated with an event detected in the video information. In some embodiments, the descriptor is part of a description, such as part of the grammatical syntax of the description. In some embodiments, the descriptor is a standalone term, such as in a list provided after the description. In some embodiments, the descriptor is at least part of metadata for the video information provided with the video information when shared or posted to a social media platform. In at least one embodiment, the descriptor is provided as a queryable hashtag provided with the video information when shared or posted to a social media platform. In some embodiments, one or more descriptors are stored in the application module. In some embodiments, a descriptor is stored in the application module associated with one or more textures, objects, animations, or events.

In some embodiments, a description and/or descriptor is at least partially based on the location (e.g., social media platform, club within a social media platform, channel within a social media platform, account under which the content is shared to the social media platform) to which the user's gameplay is posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In a specific example, the suggested description and/or descriptors may be different when sharing the content to the XBOX social media platform than when sharing the content to the YouTube social media platform. In some embodiments, one or more descriptors are stored in the application module associated with one or more social media platforms.

In other examples, the social media performance rating may be based at least partially on a club, group, or subgroup within a social media platform. For example, the social media performance rating presented to the user may be relative to the social media performance of similar clips or events within a club, group, or subgroup. While a particular event captured in the user's gameplay may have little broad appeal on a general use video sharing platform, a video game console-specific video sharing platform may provide a more focused audience, while a game-specific sharing platform (such as a game-specific club on a video game console-specific video sharing platform) may allow the post to experience even greater engagement. In a specific example, the suggested description and/or descriptors may be different when sharing the content to a specific club, group, or subgroup, as specific terminology may be favored or disfavored within the community.

In some embodiments, a system for surfacing electronic gaming video information to a user includes a client device and a server computer in communication via a data network. The system 100 includes a client device 102 and a server computer 104 in communication via a data network 106. In some embodiments, the client device 102 is a computing device with a processor 108 and hardware storage device 110 in communication with the processor 108. In some embodiments, the hardware storage device 110 is any non-transient computer readable medium that may store instructions thereon. The hardware storage device 110 may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device 110 is local to and/or integrated with the client device 102. In some embodiments, the hardware storage device 110 is accessed by the client device 102 through a network connection.

The processor 108 may execute a game application 112 that is stored on the hardware storage device 110 to render video information at least partially in response to user inputs to the client device 102. In some embodiments, the client device 102 includes a display device to display the video information to a playing user. For example, the client device 102 may be a dedicated gaming console with an integrated display (e.g., NINTENDO SWITCH) or a general-purpose computer with an integrated display (e.g., a laptop computer). In some embodiments, the client device 102 is in communication with a display device to display the video information to a playing user. For example, the client device 102 may be a gaming console (e.g., MICROSOFT XBOX) that outputs the video information to a connected display device (e.g., a television) for display to a playing user.

In some embodiments, the video information or a portion of the video information is also transmitted to a server computer 104 via a data network 106. In some embodiments, the server computer 104 is located remotely from the client device 102 and the data network 106 is or includes the World Wide Web. For example, the client device 102 may be connected to the data network 106 via the playing user's home internet connection, and the server computer 104 may be located in a datacenter. In some embodiments, the server computer 104 is located locally to the client device 102 and the video information is transmitted over a local area network or a direct data connection. For example, a competitive electronic game tournament (e.g., an eSports competition) may have a local data network 106 to which all client devices 102 used for the competition are connected. A server computer 104 connected to the local data network 106 may communicate with the client devices 102 used for the competition.

In some embodiments, the server computer 104 receives the video information from the client device 102 via the data network 106. The server computer 104 includes a processor 114 and a hardware storage device 116 in data communication with the processor 114. The hardware storage device 116 has instructions stored thereon that, when executed by the processor 114, cause the server computer 104 to perform any of the methods described herein. For example, the server computer 104 may detect events in the video information to classify different events and/or objects based on identified textures, models, animations, or other criteria.

In at least one embodiment, the server computer 104 includes or is in communication with a machine learning (ML) model that detects and/or reports events in the video information to evaluate the video information and identify and tag events. In some embodiments, the server computer 104 has stored thereon (e.g., in the hardware storage device 116) a ML model that accesses and/or communicates with ML model data 118. In some examples, the ML model data is stored locally to the server computer. In some examples, the ML model data 118 is stored remotely from the server computer 104 and accessed by the server computer 104 via the data network 106. For example, the ML model data 118 may be aggregated from and/or refined by a plurality of ML models executed by a plurality of server computers. The ML model data may be updated based on the outputs of the ML models, with the most current ML model data made available for the ML model running on the server computer 104 when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, a UI element indicating player avatar health may increase in value in response to the player avatar interacting with a health pack in the game environment.

In some embodiments, the ML system can create an application module of expected or correlated events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games including Rocket League or FIFA). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined. In some embodiments, the application module is developed and refined by the ML system by iterations of processing video information.

The system 100 further includes a social media platform 117. In some embodiments, the server computer 104 and/or the ML model accesses the social media platform 117 to obtain the comparison video(s) 119. The comparison video(s) 119 include at least video information and, in some embodiments, additional information such as audio information, user input data, game state data (including game application, game mode, player level, etc. represented in the video), video and/or post metadata (such as the posting user; upload date; post title; or video/post properties such as length, resolution, frame rate, bitrate, etc.), or other information related to the recorded gameplay. The comparison video 119 further includes social media metrics 121 that are related to the social media performance of the comparison video(s) 119. In at least one example, the most viewed comparison video 119 on the social media platform 117 associated with the game application 112 has 14,000 views, 9,500 likes, 300 comments, and has been reshared 120 times. In some embodiments, social media performance values are assigned to one or more of the social media metrics 121.

Figure 2:
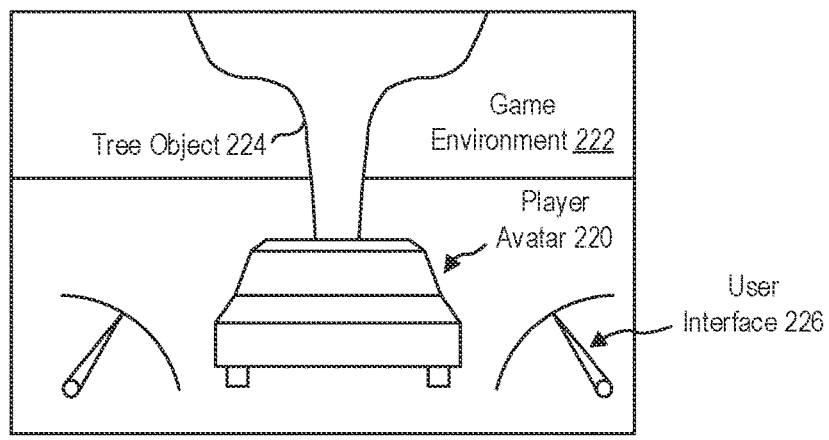
FIG. 2 is a frame of video information used to identify an event in video information of an electronic game, according to at least some embodiments of the present disclosure.

The server computer 104 and/or the ML model evaluates the comparison video 119 to identify one or more events and/or objects that can be associated with the social media metrics. Systems and methods according to the present disclosure parse the video information by detecting objects in frames of the video information. In some embodiments, the objects include virtual objects positioned in the game environment such as illustrated in FIG. 2. The video information may reflect the player avatar 220, such as a car, moving within a three-dimensional or two-dimensional game environment 222, where the position of the virtual object 224 is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar 220 relative to the overall game environment 222 and/or depending on the movement of the virtual object 224 relative to the game environment 222.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In FIG. 2, a frame of video information includes an object 224 (e.g., a tree) positioned in the game environment 222 with the player avatar 220, in this case a car. Other objects in the frame include the user interface 226 which may be independent of the three-dimensional game environment 222. The machine vision may identify the position, size, and shape of the tree object 224 relative to the player avatar 220 to determine relative position of the object 224 and the avatar 220 in the game environment 222. By evaluating the relative position of the object 224 and the avatar 220 in one frame or a sequence of frames (adjacent frames at the native framerate or non-adjacent key frames), the machine vision and/or ML system may identify a crash between the car and the tree. The crash may be identified as a key event and denoted as such relative to the social media metrics.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI 226. In other examples, a detected object that increases in size differently than the other objects in the game environment may be moving relative to the game environment. In the illustrated embodiment in FIG. 2, a crash key event may be identified by a change in the UI 226 depicting the speedometer rapidly and/or suddenly decreasing in value. For example, a rapid change in the UI 226 reflecting a change in speed of the car avatar 220 from 150 kilometers per hour (kph) to 0 kph in under 1.0 seconds may be identified as a crash.

A virtual object, as used herein, may include any object or element rendered or presented by the client device in the process of running the game application. For example, a virtual object may be an element of the UI 226. In some examples, a virtual object may be a player avatar 220. In some examples, the virtual object may be wall, floor, or other geometry of the game environment 222 such as a tree object 224. In some examples, the virtual object may be an interactive or movable object within the game environment, such as a door, crate, or power-up.

In some embodiments, the machine vision and/or ML model can identify objects in the game environment 222 without explicit training to identify the object. For example, a machine vision system that includes ML may learn to identify tree objects 224 within the game environment 222, even if the particular model of tree object 224 has not been explicitly taught to the machine vision system. In at least one example, systems and methods according to the present disclosure may be portable between video information from a variety of game applications where different models for common objects, such as tree object 224, are used. By training the ML model, the machine vision may be able to recognize and detect tree object 224 in the video information. In some examples, elements of the game environment are procedurally generated. A series of procedurally generated tree objects 224 may include common elements but be distinct models from one another, as rendered in the video information. Therefore, an explicitly provided model would be inapplicable to procedurally generated tree objects 224.

In some embodiments, the machine vision system invokes an application module that is associated with the game application that is the source of the video information. Art styles can vary considerably between game applications. Even a ML model that has been trained on video information from a plurality of game applications to detect tree objects 224 may fail when presented with a new art style. For example, while both Fortnite and Call of Duty are competitive first-person shooter games, the appearance of objects is very different between the games. Specifically, tree objects 224 and other elements of the game environment 222 appear very different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

The social media metrics of the comparison video(s) obtained from the social media platform (e.g., "likes", shares, comments, views, saves, or other social media metrics) may be reported to the ML model and/or ML model data to further refine the ML model based on other user's reactions to the events and/or the associated tags. For example, a clip published to social media showing an elimination performed at very low resource levels in League of Legends may spur greater social engagement than a single elimination performed with high resource levels. The ML model may, therefore, refine and train over time to identify and/or highlight events which are correlated to high levels of social engagement on social media. Upon detection and identification of similar or the same events in user's gameplay, a system or method according to the present disclosure suggest or prompts the user to post a recording of the event on the same or other social media platform.

Figure 3:
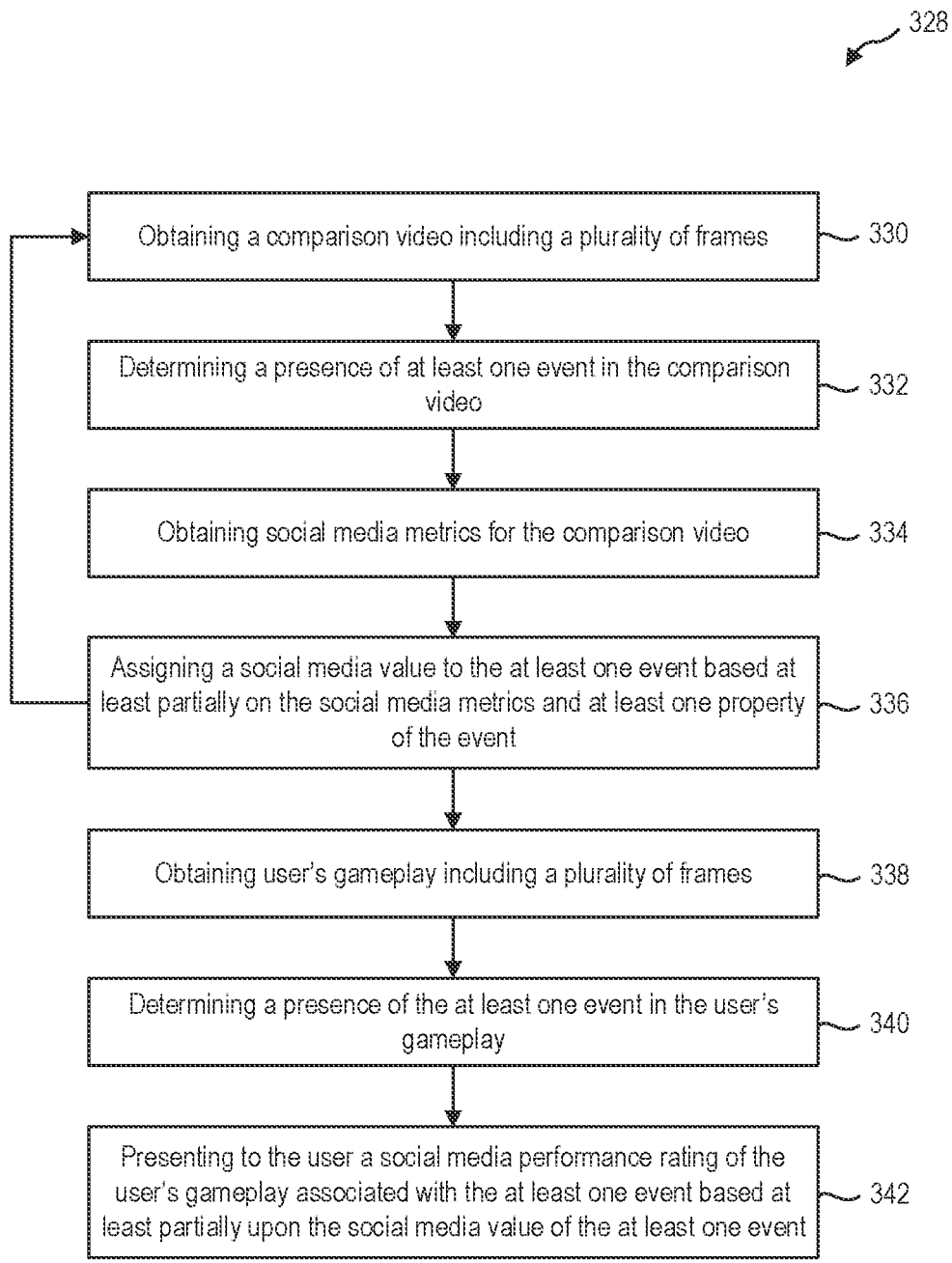
FIG. 3 is a flowchart illustrating a method of presenting video information from an electronic game to a user, according to at least some embodiments of the present disclosure.

FIG. 3 is a flowchart illustrating an embodiment of a method 328 of presenting electronic game video information performed at a server computer (e.g., server computer 104 of FIG. 1). The method 328 includes obtaining a comparison video including a plurality of frames 330. In some embodiments, the method 328 can be performed on any source of video information from a game application (e.g., game application 112 of FIG. 1), such as gameplay recordings, recreated renderings of a gameplay session based on game state data, or from live streams of the gameplay. For example, obtaining the comparison video may include obtaining the video information in real-time as the comparison video is generated by the processor(s) of the client device (e.g., during live streaming of gameplay). In some examples, obtaining the comparison video includes accessing a recording of the comparison video that was generated by the processor(s) of the client device after the fact, such as from archived gameplay recordings and/or game state data posted on a social media platform. In some examples, obtaining the comparison video includes downloading a video recording from a social media platform.

The method 328 includes evaluating at least one frame of the plurality of frames of the video information at to identify a virtual object, texture, model, or animation. After identifying the virtual object, texture, model, or animation in the frame, the method includes determining a presence of at least one event associated with the detected element at 332.

The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

In some embodiments, the determining the presence of at least one event in the video information includes comparing the detected object, texture, model, or animation to one or more events of an application module. As described herein, the application module may be predetermined or may be generated by a ML system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience, which may result in greater social media value.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold. In some embodiments, the social media value is at least partially related to the rarity of the rare event. For example, the social media value may be greater for a rarer event, as a rare event is more likely to generate engagement on social media.

While some embodiments of systems and methods for presenting video information to a user evaluate only video information, some embodiments evaluate other forms of information or data to supplement the video information. In some embodiments, the comparison video obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

The method further includes obtaining social media metrics for the comparison video(s) at 334. In some embodiments, the social media metrics include views, likes, comments, replies, saves, reshares, etc. The social media metrics include any metrics by which engagement and/or consumption of the posted comparison video are measured.

In some embodiments, at least one event, object, or tag is identified in the comparison video, and the presence of the at least one event, object, or tag is assigned a social media value based at least partially upon the social media metrics of the comparison video and at least one property of the event at 336.

In some embodiments, the property of the event includes any of the described types of events or other types of events. In some embodiments, the property of the event includes any of the described types of metadata. In some embodiments, the property of the event includes any of the described types of tags associated with the event. The property of the event and/or properties of other events or objects in the video information may modify the social media value of the event(s).

In some embodiments, a plurality of identified events within a preset temporal proximity to one another may be recorded or reported to the user as an event amplitude. For example, a particular point in the video information or a portion of the video information with a high density of events may indicate a particularly climatic moment or sequence in the video information. The high density of events may be of particular interest to a viewer or social media users, and the temporal proximity of the events may be assigned an additional or multiplied social media value.

The method 328, in some embodiments, further includes obtaining user's gameplay including a plurality of frames at 338. In some embodiments, obtaining the user's gameplay includes obtaining the plurality of frames in real-time as the user's gameplay is rendered or generated by the computing device executing the game application. For example, obtaining the user's gameplay may include obtaining the gameplay from the computing device executing the game application. In other examples, obtaining the user's gameplay may include receiving a live stream of the user's gameplay from the computing device executing the game application.

In some embodiments, obtaining the user's gameplay includes accessing a recording of the user's gameplay. In some examples, the recording includes the video information, audio information, user input data, game state data, or other information that can be used to view or recreate the original user's gameplay.

The method 328 further includes determining a presence of the at least one event in the user's gameplay at 340. It should be understood that, while the presently described embodiment of the method 328 refers to a single event, in other embodiments, systems and methods according to the present disclosure are evaluating the user's gameplay for a plurality of events at any given time. For example, the user's gameplay may be evaluated for the presence of elimination events, round victory events, match victory events, point capture events, scoring events, defense events, building events, or any other identified key event, popular event, rare event, exploit event, etc.

Determining a presence of the at least one event in the user's gameplay may be performed according to any of the described methods used to determine the presence of the at least one event in the comparison video(s). In some embodiments, the same ML system, ML model data, application module, or combination thereof used to determine the presence of the at least one event in the comparison video(s) are used to determine the presence of the at least one event in the user's gameplay. In other embodiments, a different ML system, ML model data, application module, or combination thereof is used. For example, the ML model data may be revised and/or updated using a more processor-intensive first ML system used to evaluate the comparison video(s) while a second ML system is run locally on the computing device that executes the game application to evaluate the user's gameplay in real-time. Because the local computing device may have less computational resources than a server computer (or server computers), the first ML system and second ML system may be different.

The method 328, in some embodiments, further includes presenting to the user a social media performance rating of the user's gameplay associated with the at least one event based at least partially upon the social media value of the at least one event at 342. In some embodiments, the social media performance rating of the user's gameplay presented to the user is a total of all detected events in the user's gameplay. For example, in a 60 second recording, three events may be detected and a total rating of the three events is presented to the user. In some embodiments, the social media performance rating is presented on a numerical scale, such as 1 to 100. In some embodiments, the social media performance rating is a letter grade, such as F to A+. In some embodiments, social media performance rating is a sum of the social media values of a plurality of events, such as a nominal total.

In some embodiments, the social media performance rating is calculated for an individual event, such as during real-time analysis of the user's gameplay. In such examples, a detected event in the user's gameplay may be noted and surfaced to the user with a social media performance rating for the event, such as a round-winning goal being detected as a key event and presented to the user with a social media performance rating of 25 out of 100. In some embodiments, a plurality of events are detected and presented to the user as a single sequence of events with a social media performance rating. For example, the round-winning elimination described previously may be the final event in a sequence including three other eliminations while the user's avatar was low on resources, such as health, energy, mana, ammunition, cooldowns, etc. Such as sequence may be presented to the user with a total social media performance rating for the plurality of events detected in the sequence.

In some embodiments, detecting an event in the user's gameplay may begin a timer. The timer allows any subsequent detected events to be associated with the first event in a sequence. For example, a single elimination detected in the user's gameplay in a MOBA may begin a 3 second timer, a 5 second timer, a 10 second timer, or timer of other duration. Additional event(s) (such as additional eliminations) detected within the timer may add the additional event(s) to the sequence. Additional events(s) may reset or further extend the timer to allow the detection and addition of still more events. Upon expiration of the timer, the sequence is presented to the user with a social media performance rating. In some embodiments, the sequence is presented as a suggested capture or suggested post, in addition to the social media performance rating.

In some embodiments, a plurality of detected events is presented to the user with the total social media performance rating of the plurality of detected events, as described. In other embodiments, the plurality of detected events is presented to the user with a social media performance rating that is based on a modified social media value of the plurality of detected events. In some embodiments, a multiplier is applied to the sum of the social media performance rating of the plurality of detected events. For example, a single elimination may have a social media value of 10 points, while each elimination increases a multiplier coefficient by 0.1. In such an example, a sequence of two eliminations is scored as 1.1*(10+10), and a sequence of 5 eliminations is scored as 1.4*(10+10+10+10+10).

In some embodiments, the multiplier is linear. In other embodiments, the multiplier is nonlinear. In some embodiments, the multiplier is based at least partially on the temporal proximity of the detected events. For example, the closer in time the events occur, the greater the multiplier. A sequence of two eliminations that occur 5 seconds apart may be assigned a lesser social media performance rating than a sequence of two eliminations 1 second apart.

In some embodiments, the multiplier is based at least partially upon the source of the event. For example, a detected event that is performed by the user's avatar in the user's gameplay may be assigned a greater social media performance rating than a detected event performed by a second user's avatar in the user's gameplay. In a particular example, a unique or exciting combo in a fighting game application that is performed by the user may be assigned a first social media performance rating for the user's gameplay compared to the same unique or exciting combo in the fighting game application when performed by an opponent against the user in the user's gameplay. While the detected combo has an assigned social media value based at least partially on evaluations of comparison videos, the detected combo may have less social media performance rating for the user when the user is the receiving character of the combo.

In some embodiments, one or more social media performance ratings are presented to the user based on the social media platform to which the user's gameplay may be posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In other examples, the social media performance rating may be based at least partially on a club, group, or subgroup within a social media platform. For example, the social media performance rating presented to the user may be relative to the social media performance of similar clips or events within a club, group, or subgroup. While a particular event captured in the user's gameplay may have little broad appeal on a general use video sharing platform, a video game console-specific video sharing platform may provide a more focused audience, while a game-specific sharing platform (such as a game-specific club on a video game console-specific video sharing platform) may allow the post to experience even greater engagement.

In some embodiments, presenting to the user a social media performance rating of the user's gameplay associated with the at least one event based at least partially upon the social media value of the at least one event includes presenting a notification in the user interface of the game application or at a computing device shell- or OS-level independent of the game application in real-time during gameplay. For example, the notification may inform the user with a visual representation of the detected event(s) and a social media performance rating thereof. In some embodiments, the notification includes a suggestion to capture the detected event(s) for later posting. In some embodiments, the notification includes a suggestion of a clip length to capture the detected event(s).

In other embodiments, the method 328 includes automatically capturing the detected event(s) and the notification informs the user that a clip has been captured along with a visual representation of a predicted social media performance rating of the clip. In some embodiments, the clip is automatically captured when the social media performance rating exceeds a threshold value. For example, a suggestion to capture a clip may be made when an event is detected with a social media performance rating greater than 25 out of 100, while the clip is automatically captured when the calculated social media performance rating for the detected event(s) is greater than 75 out of 100.

A suggestion for capture and/or posting may be based at least partially upon the type of event(s) detected. For example, rare events, exploit events, or other technical occurrences may be of little interest to a social media audience, at large, as a detailed understanding of a game application's game design or game engine may be needed to understand and appreciate the detected events. In a specific example, a series of wave dashes in Super Smash Bros. Melee may be of particular interest to a dedicate community of experienced players, while casual players may not appreciate the technical inputs necessary to accomplish the events in the clip. Such events may be suggested for posting to specialized groups or clubs within a social media platform.

In some embodiments, presenting to the user a social media performance rating of the user's gameplay associated with the at least one event based at least partially upon the social media value of the at least one event includes suggesting one or more clips within the user's gameplay for posting to social media. For example, the method 328 may include providing a visual representation of the identified events in a video editor interface and/or metadata of the user's gameplay that is at least partially based on social media performance ratings.

Figure 4:
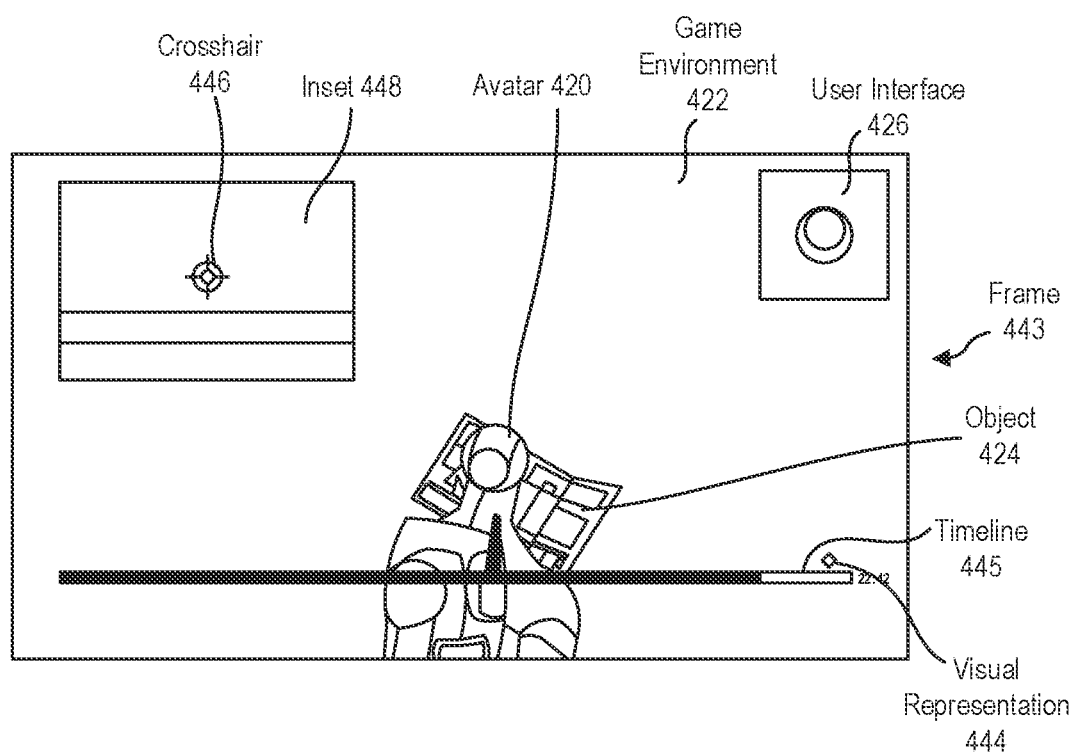
FIG. 4 is an illustration of a frame of video information with a video information timeline including visual representation of identified events in the video information, according to at least some embodiments of the present disclosure.

In some embodiments, the visual representation or visual indicator is a dot, dash, shape, or symbol presented on a UI of the video information editing or viewing software, such as illustrated in FIG. 4. A frame 443 of the video information is shown including a representation of the game environment 422 with the player avatar 420 visible holding a map object 424. The detection of a map object 424 in the possession of the player avatar 420 may indicate a building key event. In some embodiments, a UI element 426 (such as a map) may provide information and/or context to the event, such as the map providing a location in the game environment 422.

FIG. 4 illustrates the frame 443 presented to a user in a video information editing and/or viewing software application. A video information timeline 445 indicates the temporal location of the frame 443 within the video information. In some embodiments, one or more visual representations 444 of identified events are positioned on or near the timeline 445 to indicate to the user the temporal location of the events in the video information.

In some embodiments, the shape or symbol of the visual representation 444 representing the event on the video information timeline 445 may be unique to the type of event or tags associated with the event. For example, a dot may indicate a key event, a heart may indicate a popular event, and a diamond may indicate a rare event. In some examples, different key events may have different symbols or visual representations associate with the key events, such as an "X" symbol indicating a player elimination key event, a crosshair 446 indicating an opponent elimination event (in the inset 448 of FIG. 4), a cross indicating a healing key event, a checkered flag indicating a round end, etc. Each of these events or sequences of events has a social media value or social media performance ratings associated therewith.

In some embodiments, the visual representation 444 is associated with a single detected event. The visual representation 444, in some embodiments, includes a social media value for the detected event. For example, the visual representation 444 may be or include a numerical value. In other examples, the visual representation 444 may be or include a letter value. In yet other examples, the visual representation 444 may display the social media value in an alternative text, a submenu, or other secondary display of the visual representation 444. In a specific example, a player elimination event has a visual representation 444 that is an X, and when the user places a cursor over the X, a numerical social media value is displayed.

In some embodiments, the visual representation 444 is associated with a plurality of detected events in a sequence. The visual representation 444 may be associated with a plurality of detected events. For example, the visual representation 444 may highlight a portion of the timeline 445 in which the sequence of detected events occurs. In other examples, a visual representation 444 is assigned to each of the detected events in the plurality of detected events, and when a user places a cursor over a visual representation 444 of any detected event in the sequence, the visual representations 444 of each detected event in the sequence becomes highlighted to indicate the complete sequence.

The visual representation(s) 444, in some embodiments, includes a social media performance rating for the sequence of detected events. For example, the visual representation 444 may be or include a numerical value. In other examples, the visual representation 444 may be or include a letter value. In yet other examples, the visual representation 444 may display the social media performance rating in an alternative text, a submenu, or other secondary display of the visual representation 444. In a specific example, a sequence of detected events is assigned a social media performance rating for the complete sequence, and the visual representation of each detected event includes a social media value for that event, while the social media performance rating for the complete sequence is also displayed. Therefore, a user can review the social media values for each event and also see how each event in the sequence contributes to the social media performance rating of the sequence.

In some embodiments, the visual representation is a list of timestamps, such as a table of contents or chapter list, which allows a user to link to the associated temporal location in the video information. In some embodiments, each event in the list of timestamps has a symbol, text tag, or other visual representation associated with the event to present to the user easily differentiated and recognizable links to the events in the video information. In at least one embodiment, one or more events are automatically selected and surfaced to the user as high priority events. For example, a plurality of events in close temporal proximity may produce an event amplitude above a preset threshold and prompt the video information editing or video information viewing software to present the high amplitude series of events to the user.

In some embodiments, the method 328 is performed at a server computer, either in real-time or on a recording of the user's gameplay. In some embodiments, a method of evaluating video information from an electronic game is performed at the client device or at a recording device local to the client device, which may subsequently be used to upload the video information and/or event information to a data network. While the embodiment of a method will be described in relation to a discrete recording device in data communication with the client device, it should be understood that some embodiments may be performed on the client device, itself. In at least one example, the client device is retail commodity hardware game console, and substantially all computational resources of the processor(s) are dedicated to the execution of the game application stored on the client device. As such, a recording device in communication with the client device may allow for additional computational resources local to the client device without compromising game performance.

Figure 5:
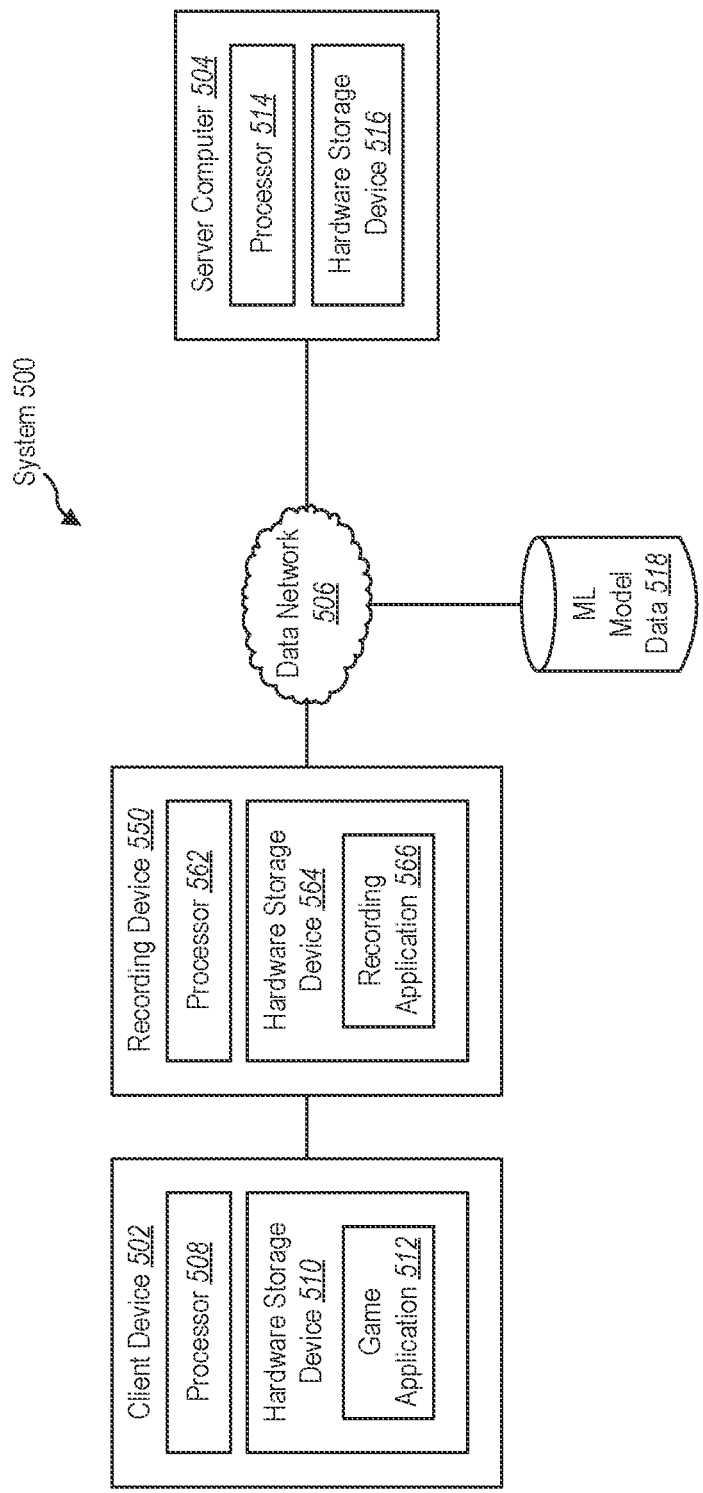
FIG. 5 is a schematic representation of another system for presenting video information from an electronic game to a user, according to at least some embodiments of the present disclosure.

FIG. 5 is a schematic illustration of a system 500 including a recording device 550 in communication with a client device 502 and a data network 506. A recording device 550, in some embodiments, includes a hardware storage device 564 in communication with at least one processor 562. The client device 502 provides video information (and, optionally, user input data, game metadata, and/or game state data) of the user's gameplay to the recording device 550. In some embodiments, the recording device 550 is connected to a data network 506 to communicate with or access a remote server computer 504 and/or ML model data 518.

The recording device 550 receives the user's gameplay from the client device 502 and evaluates the user's gameplay for events according to an application module. In some embodiments, the recording device 550 evaluates the user's gameplay according to any of the methods described herein.

Figure 6:
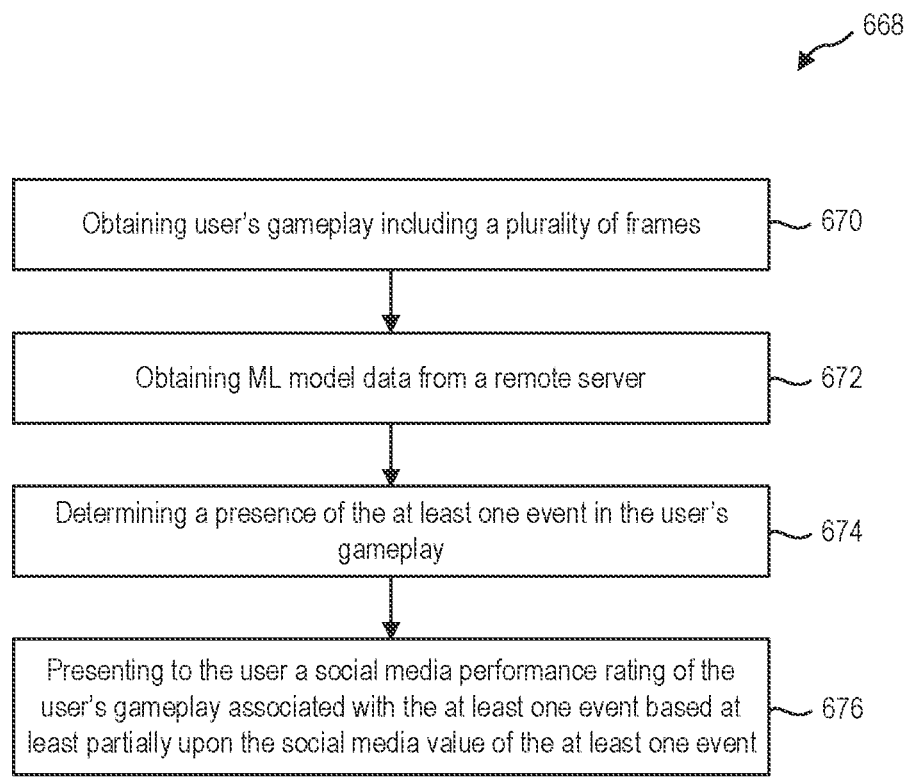
FIG. 6 is a flowchart illustrating another method of presenting video information from an electronic game to a user, according to at least some embodiments of the present disclosure.

In some embodiments, the recording device 550 or client device 502 obtains the user's gameplay produced by execution of a game application 512 on the client device 502. In some embodiments, the video information is obtained by the client device 502 upon rendering the video information. In some embodiments, the video information is obtained by the recording device 550 by a local data connection to the client device 502. Referring now to FIG. 6, in some embodiments, the user's gameplay is obtained by the recording device by a local data connection to the client device or by the client device at 670. The method 668 further includes obtaining ML model data from a remote server at 672 (such as the ML Model Data 518 of FIG. 5) containing event and/or object information for the game application represented in the user's gameplay and the social media values associated therewith. The ML Model Data 518 may be aggregated from a plurality of ML models or from other client devices, recording devices, or server computers that have evaluated video information from the same or other game applications to refine or expand the ML Model Data 518. By obtaining ML Model Data from a network source, the client device or recording device local to the client device may benefit from the other ML models and computing devices evaluating comparison videos and social media metrics of the comparison videos to continually refine the detection of events and the social media values of the detected events.

A virtual object, texture, model, or animation may be detected by any of the methods or techniques described herein. For example, detecting the virtual object, texture, model, or animation and determining the presence of at least one event in the video information may include any of the machine vision and/or ML techniques described herein. In some embodiments, the method further includes comparing the detected virtual object, texture, model, or animation to one or more events of an application module based at least partially upon the ML model data to identify the event and determine the presence of the at least one event using the ML model data at 674.

In some embodiments, the application module is created by a machine learning system through training datasets. For example, a machine learning system may evaluate many events to determine correlations between events across many video streams or recordings. In some embodiments, the application module is predetermined based on the game engine of the game application to inform the system of various events, such as key events, popular events, rare events, or any other types of events and refined with the ML Model data.

The method 668 further includes determining a presence of the at least one event in the user's gameplay at 674. It should be understood that, while the presently described embodiment of the method 668 refers to a single event, in other embodiments, systems and methods according to the present disclosure are evaluating the user's gameplay for a plurality of events at any given time. For example, the user's gameplay may be evaluated for the presence of elimination events, round victory events, match victory events, point capture events, scoring events, defense events, building events, or any other identified key event, popular event, rare event, exploit event, etc.

The method 668, in some embodiments, further includes presenting to the user a social media performance rating of the user's gameplay associated with the at least one event based at least partially upon the social media value of the at least one event at 676. In some embodiments, the social media performance rating of the user's gameplay presented to the user is a total of all detected events in the user's gameplay. For example, in a 60 second recording, three events may be detected and a total rating of the three events is presented to the user. In some embodiments, the social media performance rating is presented on a numerical scale, such as 1 to 100. In some embodiments, the social media performance rating is a letter grade, such as F to A+. In some embodiments, social media performance rating is a sum of the social media values of a plurality of events, such as a nominal total.

In some embodiments, the social media performance rating is calculated for an individual event, such as during real-time analysis of the user's gameplay. In such examples, a detected event in the user's gameplay may be noted and surfaced to the user with a social media performance rating for the event, such as a round-winning goal being detected as a key event and presented to the user with a social media performance rating of 25 out of 100. In some embodiments, a plurality of events are detected and presented to the user as a single sequence of events with a social media performance rating. For example, the round-winning elimination described previously may be the final event in a sequence including three other eliminations while the user's avatar was low on resources, such as health, energy, mana, ammunition, cooldowns, etc. Such as sequence may be presented to the user with a total social media performance rating for the plurality of events detected in the sequence.

In some embodiments, detecting an event in the user's gameplay may begin a timer. The timer allows any subsequent detected events to be associated with the first event in a sequence. For example, a single elimination detected in the user's gameplay in a MOBA may begin a 3 second timer, a 5 second timer, a 10 second timer, or timer of other duration. Additional event(s) (such as additional eliminations) detected within the timer may add the additional event(s) to the sequence. Additional events(s) may reset or further extend the timer to allow the detection and addition of still more events. Upon expiration of the timer, the sequence is presented to the user with a social media performance rating. In some embodiments, the sequence is presented as a suggested capture or suggested post, in addition to the social media performance rating.

In some embodiments, a plurality of detected events is presented to the user with the total social media performance rating of the plurality of detected events, as described. In other embodiments, the plurality of detected events is presented to the user with a social media performance rating that is based on a modified social media value of the plurality of detected events. In some embodiments, a multiplier is applied to the sum of the social media performance rating of the plurality of detected events. For example, a single elimination may have a social media value of 10 points, while each elimination increases a multiplier coefficient by 0.1. In such an example, a sequence of two eliminations is scored as 1.1*(10+10), and a sequence of 5 eliminations is scored as 1.4*(10+10+10+10+10).

In some embodiments, the multiplier is linear. In other embodiments, the multiplier is nonlinear. In some embodiments, the multiplier is based at least partially on the temporal proximity of the detected events. For example, the closer in time the events occur, the greater the multiplier. A sequence of two eliminations that occur 5 seconds apart may be assigned a lesser social media performance rating than a sequence of two eliminations 1 second apart.

In some embodiments, the multiplier is based at least partially upon the source of the event. For example, a detected event that is performed by the user's avatar in the user's gameplay may be assigned a greater social media performance rating than a detected event performed by a second user's avatar in the user's gameplay. In a particular example, a unique or exciting combo in a fighting game application that is performed by the user may be assigned a first social media performance rating for the user's gameplay compared to the same unique or exciting combo in the fighting game application when performed by an opponent against the user in the user's gameplay. While the detected combo has an assigned social media value based at least partially on evaluations of comparison videos, the detected combo may have less social media performance rating for the user when the user is the receiving character of the combo.

In some embodiments, one or more social media performance ratings are presented to the user based on the social media platform to which the user's gameplay may be posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In other examples, the social media performance rating may be based at least partially on a club, group, or subgroup within a social media platform. For example, the social media performance rating presented to the user may be relative to the social media performance of similar clips or events within a club, group, or subgroup. While a particular event captured in the user's gameplay may have little broad appeal on a general use video sharing platform, a video game console-specific video sharing platform may provide a more focused audience, while a game-specific sharing platform (such as a game-specific club on a video game console-specific video sharing platform) may allow the post to experience even greater engagement.

In some embodiments, presenting to the user a social media performance rating of the user's gameplay associated with the at least one event based at least partially upon the social media value of the at least one event includes presenting a notification in the user interface of the game application or at a computing device shell- or OS-level independent of the game application in real-time during gameplay. For example, the notification may inform the user with a visual representation of the detected event(s) and a social media performance rating thereof. In some embodiments, the notification includes a suggestion to capture the detected event(s) for later posting. In some embodiments, the notification includes a suggestion of a clip length to capture the detected event(s).

In other embodiments, the method 668 includes automatically capturing the detected event(s) and the notification informs the user that a clip has been captured along with a visual representation of a predicted social media performance rating of the clip. In some embodiments, the clip is automatically captured when the social media performance rating exceeds a threshold value. For example, a suggestion to capture a clip may be made when an event is detected with a social media performance rating greater than 25 out of 100, while the clip is automatically captured when the calculated social media performance rating for the detected event(s) is greater than 75 out of 100.

A suggestion for capture and/or posting may be based at least partially upon the type of event(s) detected. For example, rare events, exploit events, or other technical occurrences may be of little interest to a social media audience, at large, as a detailed understanding of a game application's game design or game engine may be needed to understand and appreciate the detected events. In a specific example, a series of wave dashes in Super Smash Bros. Melee may be of particular interest to a dedicate community of experienced players, while casual players may not appreciate the technical inputs necessary to accomplish the events in the clip. Such events may be suggested for posting to specialized groups or clubs within a social media platform.

In some embodiments, presenting to the user a social media performance rating of the user's gameplay associated with the at least one event based at least partially upon the social media value of the at least one event includes suggesting one or more clips within the user's gameplay for posting to social media. For example, the method 668 may include providing a visual representation of the identified events in a video editor interface and/or metadata of the user's gameplay that is at least partially based on social media performance ratings.

In some embodiments, the visual representation or visual indicator is a dot, dash, shape, or symbol presented on a UI of the video information editing or viewing software, such as illustrated and described in relation to FIG. 4.

In some embodiments, a plurality of clips may be presented to the user as a standalone video file that includes a plurality of events from the video information. In some embodiments, the video file may be automatically generated based on the identified events and tags. In some embodiments, the user may preset one or more parameters to automatically generate a "highlight reel" video file upon the evaluation of a video information. In at least one embodiment, the user may preset one or more parameters to automatically generate a "highlight reel" video file upon the termination of a live video stream. An electronic game streamer, therefor, is able to play the electronic game, broadcast the content in real-time during the gameplay, and, upon completion of the gameplay session and termination of the real-time video stream, have the system automatically create a highlight video file of the streaming session for the user to post online.

When sharing or posting a video clip, a screen capture, or compilation of videos and/or images (such as the automatically generated highlight reel, as described above), a user may be presented with the option to input a text description or caption for the posted content. In some embodiments, a system and/or method according to the present disclosure automatically provides recommended text for the description or caption based on one or more events detected in the content.

Figure 7:
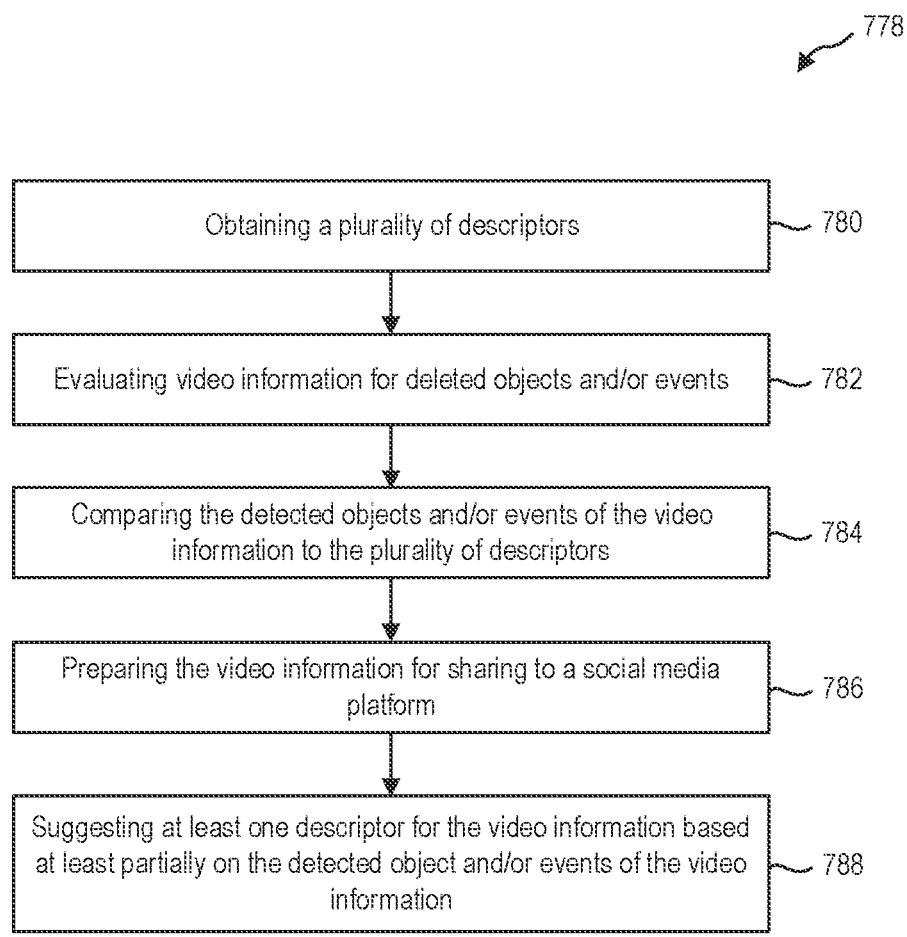
FIG. 7 is a flowchart illustrating a method of improving descriptors of video information from an electronic game, according to at least some embodiments of the present disclosure.

FIG. 7 is a flowchart illustrating an embodiment of a method 778 of providing a suggested description or descriptor for sharing of video information. In some embodiments, a suggested description or descriptor is related to elimination events, round victory events, match victory events, point capture events, scoring events, defense events, building events, or any other identified key event, popular event, rare event, exploit event, etc. The suggested description or descriptor may be obtained from an application module containing information related to the detected event or object in the video information. The suggested description or descriptor may be obtained from the description or descriptor parsed from or detected in comparison videos with similar or the same detected events.

In some embodiments, a description for the video information is at least part of a caption provided with the video information when shared or posted to a social media platform. In some embodiments, a description for the video information is at least part of metadata for the video information provided with the video information when shared or posted to a social media platform. In some embodiments, a description for the video information includes one or more descriptors. In some embodiments, a description for the video information is at least part of a text appended to or overlaid on the video information when shared or posted to a social media platform. For example, the description may be displayed in the frame of the video information during viewing by a viewer.

In some embodiments, a description includes one or more descriptors. A descriptor is a specific term that is related to an event or object in the video information. In some embodiments, the descriptor is associated with an object detected in the video information. In some embodiments, the descriptor is associated with an event detected in the video information.

In some embodiments, the descriptor is part of a description, such as part of the grammatical syntax of the description. In some embodiments, the descriptor is a standalone term, such as in a list provided after the description. In some embodiments, the descriptor is at least part of metadata for the video information provided with the video information when shared or posted to a social media platform. In at least one embodiment, the descriptor is provided as a queryable hashtag provided with the video information when shared or posted to a social media platform. In some embodiments, one or more descriptors are stored in the application module after detection and/or association with a texture, object, animation, or event. In some embodiments, a descriptor is stored in the application module associated with one or more textures, objects, animations, or events.

In some embodiments, a description and/or descriptor is at least partially based on the location (e.g., social media platform, club within a social media platform, channel within a social media platform, account under which the content is shared to the social media platform) to which the user's gameplay is posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In a specific example, the suggested description and/or descriptors may be different when sharing the content to the XBOX social media platform than when sharing the content to the YouTube social media platform.

In some embodiments, the method includes obtaining descriptor terms at 780. In some embodiments, the descriptors are obtained from an application module that is accessed by a processor. In some embodiments, the application module is obtained from remote server, such as described in relation to FIG. 1. In some embodiments, the application module is stored locally to the processor, such as on a hardware storage device of a video game console or a general-purpose computer. In some embodiments, the application module with descriptors and/or descriptions is provided by a developer and/or publisher of the application. For example, a game application, such as Destiny, may have an application module provided by the developer of the game application, such as Bungie, or the publisher of the game application, Activision.

In some embodiments, the application module is created by analysis of a plurality of comparison videos. For example, an ML model may access or obtain a plurality of comparison videos from one or more social media platforms or other sources (such as video game review websites) and evaluate the description of the comparison video in relation to the objects and/or events in the comparison video. In at least one example, the comparison video is evaluated based on one or more system or method described herein to detected and identify one or more objects or events in the video. In some embodiments, the method includes recording the descriptor(s) in the application module. In some embodiments, the method includes recording the descriptor(s) in the application module associated with one or more textures, objects, animations, or events.

In some embodiments, the ML model compares the detected objects and/or events of a first comparison video to the detected objects and/or events of a second comparison video. Comparison videos with the same detected objects and/or events may have the respective descriptions thereof compared to one another by the ML model to determine shared descriptors between the first comparison video and the second comparison video. Shared descriptors in the respective descriptions of comparison videos with shared objects and/or events may provide a correlation between the descriptors and the respective objects and/or events.

In some embodiments, the descriptors correlated to the presence of the detected objects and/or events are further ranked or prioritized based at least partially on the social media metrics of the comparison videos. For example, a comparison video with higher social media metrics may be indicative of a greater recognition of and/or interest in the descriptor and/or the detected object or event associated with the descriptor, which leads to greater social media engagement with the comparison video. In other examples, the comparison video with the higher social media metrics may be a more popular channel or account that drives more engagement in the community around the content, and the descriptors used by the popular channel or account may establish community terms for the detected objects and/or events. Using the same descriptors for the detected objects and/or events as comparison videos with high social media metrics may produce greater engagement with the user's video information when shared or posted to a social media platform.

In some embodiments, the application module may be developed by the ML model through evaluation of a plurality of comparison videos and the descriptions thereof to create the application module. In some embodiments, an initial application module is provided to the ML model, and the ML model further refines the application module with descriptors correlated to objects and/or events. In some embodiments, the ML model refines the objects and/or events of the application module, such as described herein. In some embodiments, the ML model refines the descriptors of the application module, such as described herein. In at least one embodiment, the ML model refines both the descriptors and the objects and/or events of the application module.

In some embodiments, the ML model refines the descriptors to add descriptors related to a detected object and/or event. For example, the ML model may evaluate a plurality of comparison videos containing the detected object and/or event and, despite the application module containing a correlated descriptor for the detected object and/or event, determine a new descriptor for the detected object and/or event and add that new descriptor for the detected object and/or event. In doing so, the ML model may refine the application module to include community terms that arise organically in the community for the detected object and/or event in the application (such as a nickname for a character) or genre terms that are adopted from other applications in the genre (such as a generic name for an in-game strategy). In at least one example, the new descriptor is added to the application module in addition to the previous descriptor for the detected object and/or event. In other examples, the new descriptor may replace the previous descriptor in the application module.

The descriptors are, in some embodiments, ranked or prioritized for a detected object or event based at least partially on the social media metrics of comparison video(s). For example, the ML model may determine that a first descriptor and a second descriptor are both correlated to the presence of a detected object or event in comparison videos. The ML model may further determine a social media metric for the comparison videos for those including the first descriptor and for those including the second descriptor. The ML model may refine the application module to include both the first descriptor and the second descriptor, with a higher ranking or priority to suggesting the descriptor with higher social media metrics, or refine the application module to include only the descriptor with the higher social media metric.

In some embodiments, a descriptor is classified as one or more class of terms. For example, a descriptor may be classified as an event term, a mode term, an object term, a genre term, a platform term, a community term, a precise term, or other class of term related to the detected object and/or event. In some embodiments, an event term is a descriptor related to an event in the video information, such as a round victory, an elimination, or a character revival. In some embodiments, event terms include further subclasses for different subclasses of events, such as key events, rare events, popular events, etc.

An object term may be a descriptor related to an object in the video information, such as a particular weapon, pick-up, avatar, etc. present in the video information. In some embodiments, an object or event may be present in a plurality of game modes or conditions, and at least one descriptor of the application is related to a particular game mode. For example, an elimination event may be present in a single-player mode and a multiplayer mode. In other examples, an elimination event may be present in a Team Elimination mode of multiplayer and a Capture-the-flag mode of multiplayer. A descriptor may be associated with the identified mode of the application.

In some embodiments, a game term is a class of descriptor that is not specific to a mode, event, or object, but is a class of descriptor that is correlated to the game application represented in the video information. For example, a game term may be a title of the game application (such as Halo Infinite), a title of the game franchise (such as Halo), or a term that is general to the game application, such as the name of the main character of the game application (such as Master Chief in the Halo franchise).

In some embodiments, a genre term is a class of descriptor that is not specific to a game application, mode, event, or object, but is a class of descriptor that is correlated with a plurality of game applications within a genre of applications. For example, a genre term may be a genre title, such as FPS, MOBA, MMORPG, Football, auto racing, etc. A genre term may be a class of descriptor that facilitates users or viewers discovering new content related to the user's interests, irrespective of the specific game application.

In some embodiments, a platform term is a class of descriptor that is not specific to a game genre, game application, mode, event, or object, but is a class of descriptor that is correlated with a plurality of game applications across a platform for playing the plurality of game applications. In some examples, a platform term is a descriptor related to a hardware platform on which the game application is played, such as XBOX, PLAYSTATION, SWITCH, etc. In some examples, a platform term is a descriptor related to a software platform on which the game application is played, accessed, or obtained, such as XBOX LIVE, XBOX GAME PASS, PLAYSTATION NOW, AMAZON LUNA, GOOGLE STADIA, STEAM, etc. In some examples, a platform term is a descriptor related to a hardware input device by which the game application is played such as XBOX ELITE CONTROLLER, PLAYSTATION VR, HITBOX, etc. In some embodiments, the computing system on which the video information is captured includes the input device and/or peripheral device configuration of the computing system executing the application, and the video information may include the input device and/or peripheral device information in metadata of the video information.

In some embodiments, a community term is a class of descriptor that is associated with the detected object and/or event in the video information and is determined from comparison videos. The community term need not be specific to the game application and may be correlated with a plurality of game applications. In some embodiments, a precise term is a class of descriptor that is uniquely associated exclusively with the detected object and/or event in the video information of a single game application or game franchise. For example, a precise term is associated with the detected object and/or event in the video information and may be provided in the application module by the developer or publisher of the application. In other examples, the precise term is associated with the detected object and/or event in the video information and is determined from comparison videos.

The method further includes evaluating the video information for detected objects and/or events at 782. The user's video information may be evaluated in real-time during gameplay or after the video information is captured (e.g., evaluated afterward and/or off-line). In some embodiments, the user's video information is evaluated for detected objects and/or events by any system or method described herein. The user's video information may be evaluated locally, such as on the computing device running the application, or may be evaluated remotely, such as on a server computer. In examples where the video information is captured, the video information may be evaluated in real-time and/or upon capture and one or more descriptors may be assigned to the metadata of the video information. For example, the captured video information may include one or more descriptors in the metadata of the video file that are correlated with one or more object and/or event in the video information. In at least one embodiment, the metadata includes one or more descriptors, tags, or identifiers that are related to the content which may not be readily detectable from the video information. For example, a timestamp of when the video information was captured, a region of the world or a country in which the user was playing the game application, if the video information was captured during tournament play, ranked play, etc., a username, or other parameters or information of the video information not available from the content of the video information. In some embodiments, the method optionally includes evaluating the metadata of the video information to identify any descriptor previously assigned to the video information.

The method further includes comparing the metadata and/or the detected objects and/or events of the video information to an application module containing a plurality of descriptors associated with the video information at 784. For example, a detected object of the video information may be correlated with a precise term in the application module for that object. In another example, a detected event of the video information may be correlated with a plurality of event terms (which may include community terms and/or precise terms). In yet another example, the metadata may be correlated with one or more mode terms or platform terms.

In some embodiments, the method includes preparing content for sharing/posting to a social media platform at 786 by preparing the video information and an associated description and/or descriptor. Preparing the video information includes encoding or compressing the video information according to any method known in the art. Preparing an associated description and/or descriptor, in some embodiments, includes suggesting at least part of a description and/or at least one descriptor for the video information based at least partially on the detected object and/or events of the video information.

A system or method according to the present description may provide to the user a pre-populated suggested description and/or list of descriptors. For example, the suggested description may be an automatically generated description including one or more descriptors to describe the content of the video information. The user may subsequently accept, edit, or delete the suggested description. In other examples, a suggested descriptor list is provided with a series of suggested descriptors that may be presented in a list of hashtags (to facilitate querying by other users) or simply a list of descriptors that function as writing prompts to the user to suggest most-relevant terms for the video information.

In some embodiments, preparing an associated description and/or descriptor includes populating an on-screen or software-based keyboard for the user to write the description with suggested descriptors. For example, an on-screen keyboard may provide a conventional QWERTY layout of individual letters while a plurality of suggested descriptors are also provided on-screen to simplify the on-screen typing and/or function as writing prompts to the user to suggest most-relevant terms for the video information. A user may select a suggested descriptor from the provided list to insert the selected descriptor into the user-generated description.

In some embodiments, preparing an associated description and/or descriptor includes populating a dictionary for spell-check, autocorrect, or autofill for a user-generated (or partially user-generated) description. For example, many descriptors in the application module may be words or alphanumeric sequences that do not exist in conventional dictionaries used for word processing. In at least one example, the game application Halo Infinite includes an event called a "grapplejack". The event term "grapplejack" is not included in conventional dictionaries, but a user may want to include the term in the description for accuracy and for visibility of the content on the social media platform. The descriptors identified in the application module as related to the video information are, in some embodiments, loaded into the dictionary used for the spell-check, autocorrect, or autofill for the user typing the description, allowing and encouraging the proper descriptors for the video information.

In some embodiments, the suggested description and/or descriptors may be modified and/or suggested based at least partially on the sharing location. For example, certain descriptors may be more prevalent or may exist/not exist on different social media platforms, channels, clubs, or accounts within a social media platform. In at least one example, the application module may include a community term that is primarily or exclusively used in a particular club within a social media platform. In some embodiments, the application module includes information related to the frequency and/or social media metrics relative to the use of a descriptor in a particular location.

Figure 8:
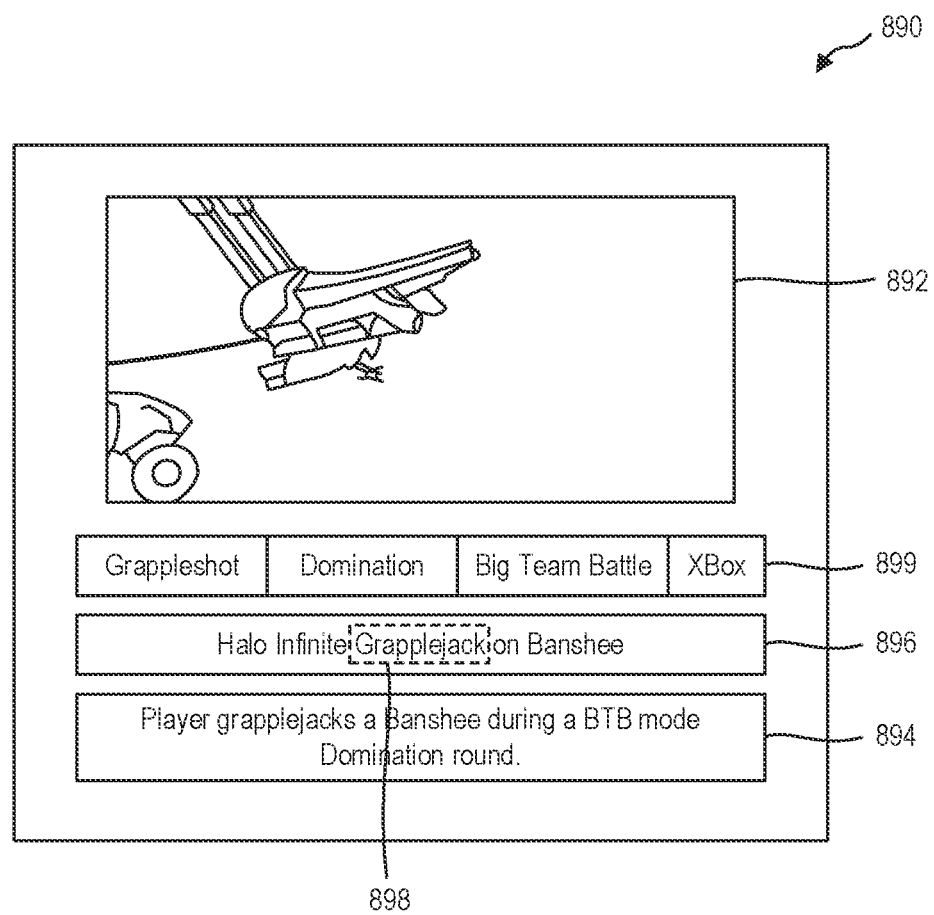
FIG. 8 is a user interface for automatically providing suggested descriptors for sharing video information, according to at least some embodiments of the present disclosure.

FIG. 8 is an illustration of an embodiment of a user interface 890 for sharing video information to a social media platform. In at least one example, the user interface 890 is presented to a user on a display for use with an embodiment of the method 778 described in relation to FIG. 7. In some embodiments, the user interface 890 includes a frame 892 of captured video information with a description 894 of the video information and/or a title 896. In some embodiments, the user interface 890 includes at least one suggested description 894 of the video information and/or a suggested title 896 based on an application module in preparation for sharing the video information to a social media platform. In some embodiments, the suggested description 894 and/or suggested title 896 is pre-populated with at least one descriptor 898.

In some embodiments, the user interface 890 includes a descriptor list 899 including a plurality of selectable descriptors 898 that are insertable into the description 894. The user may provide a user-generated description 894 and/or title 896 while inserting at least one of the suggested descriptors from the descriptor list 899. In at least one embodiment, a social media metric is displayed and/or associated with the suggested descriptor from the descriptor list 899. In at least another embodiment, a social media performance rating of the video information post, as a whole (e.g., the video information, current description, and current title), is presented to a user during preparation of the video information for sharing to the social media platform. In some embodiments, the social media performance rating is updated in real-time, as the user makes changes to the description and/or title, to provide a user with feedback as to the prediction of the social media performance of the video information post.

Systems and methods according to the present disclosure may be used to confirm the presences of event or objects described or hashtagged in the description of content posted to a social media platform to limit clickbait. In some social media platforms, it has become commonplace to include a list of hashtags or other descriptors in a caption to drive visibility of a post based on the popularity of the hashtags or other descriptors, even if the content of the video information posted is unrelated to the list of hashtags or other descriptors. In some embodiments, a system or method according to the present disclosure may evaluate the video information to determine the presence of detected objects and/or events and compare the detected objects and/or events to a user-generated description or descriptors. In some embodiments, a system or method may modify, flag, or prohibit a description or descriptor that is determined to be unrelated to the content of the video information.

INDUSTRIAL APPLICABILITY

The present disclosure relates generally to systems and methods for improving social sharing of video information produced by a game application or other video information. Systems and methods described herein provide automatic detection and identification of objects and elements in gameplay video information in electronic gaming. In some examples, a streaming content creator, a speedrunner, a casual player, or a competitive player may play, stream, and/or record many hours of gameplay per day. In some embodiments of systems and methods according to the present disclosure, video information of the user's gameplay is evaluated to detect objects and events using machine vision. In some embodiments, a machine learning (ML) system evaluates the video information of the user's gameplay with the machine vision system in addition to evaluating associated audio information, game state data, user inputs, or combinations thereof of the user's gameplay to detect events and/or objects in user's gameplay. The detected objects and events are then identified and/or classified to allow suggestions of descriptions or descriptors of the user's gameplay.

In some embodiments, the suggested descriptions or descriptors are based at least partially upon a database of predetermined terminology associated with the identified and/or detected events and/or objects. By using terminology that efficiently, accurately, and precisely describes the identified and/or detected events and/or objects of the shared content, the visibility and/or searching of the content may be improved. In some embodiments, the suggested descriptions or descriptors are based at least partially upon the descriptions or descriptors of other streams, recordings, screen captures, or other gameplay ("comparison video") from the same or different users. By using consistent terminology for the descriptions or descriptors within a community of users, the visibility and/or searching of the content may be improved.

In some embodiments, the comparison video is obtained from information posted on a social media platform. The comparison video is evaluated to determine social media metrics of the comparison video, such as views, likes, shares, comments, replies, saves, recordings, and other social media metrics (both total and relative to a given time period) to determine the performance of the comparison video on the social media platform(s). The descriptions or descriptors of the comparison video may be parsed to determine the terminology used in association with the content of the comparison video. In some embodiments, the social media metrics of the comparison video(s) are used to weight the descriptions or descriptors associated with the comparison video to allow a prediction of a performance and/or engagement of the user's video on the same or similar social media platform using the same or similar descriptions or descriptors. In some embodiments, the social media metrics are used to provide a user a social media performance rating to predict the relative performance of the user's video and/or the descriptors used to describe the content of the video.

For example, views can indicate the number of times the comparison video is watched or the number of unique users that viewed the comparison video. In some examples, likes indicate the number of users that viewed the comparison video and found the comparison video interesting or entertaining enough to click and support the comparison video. Shares can indicate extended reach of the comparison video throughout the social media platform. Comments and replies to comments reflect a level of community engagement and conversation about the content of the comparison video. Recordings can include the number of times the entire or a portion of the comparison video is copied or clipped for distribution elsewhere, such as a viewer clipping a portion of a live stream or recorded comparison video. More viewers clipping the same portion of a live stream may indicate particular interest in specifically that portion of the comparison video.

The comparison video(s) may be evaluated for the presence of events and/or objects that are related to the social media metrics of the comparison video(s). Detection and identification of the same or similar events and/or objects in the user's video information can determine whether the user's video information contains the same or similar events and/or objects that indicate the user's gameplay will perform well (e.g., have relatively large quantities of views and/or engagement) on a social media platform. In some embodiments, systems and methods according to the present disclosure prompt or suggest to the user to screen capture, record, clip, or post the user's gameplay based at least partially on the comparison of the user's gameplay to the comparison video and social media metrics of the comparison video.

In some embodiments, a comparison video with high social media metrics is a better indicator of community engagement, recognition, and/or adoption of the terminology used in the descriptions or descriptors. For example, many terms for events or objects in a gameplay video may be created by the community. In some examples, an accepted and recognized community term for an event may be different than a term for the specific event in the game. In a particular example, the fighting game community (FGC) recognizes the term "Dragon Punch" and "Super" for certain categories of special attacks, irrespective of the precise terminology used for that game application. Content posted by a user may experience greater visibility and/or engagement when community terminology is used.

Additionally, a developer or publisher of a game may desire to additionally promote the visibility or adoption of game-specific terminology. Suggested descriptions or descriptors may be provided to a user to additionally or alternatively promote terminology that is more accurate or precise to a particular game application than the community terminology. For example, a community term within a genre may be imprecise when applied to a specific game application, and suggested descriptions or descriptors may provide greater precision than a community term. In a particular example, within the Souls-like genre the term "Bonfire" has been accepted as a community term for any save point, while the precise term for a save point within another game in the genre may be "Meditation point" or "Site of Grace". Suggesting one or both of the community term and game-specific term for the content descriptions or descriptors may provide greater visibility, recognition, or searching for the content and the terminology.

In some embodiments, the user's gameplay is evaluated (e.g., object and/or events detected and/or identified) in real-time during interactive gameplay. For example, the user's gameplay may be evaluated by a client-side service that evaluates the user's gameplay on the same computing device (such as a personal computer or video game console) that is executing the game application. In another example, the user's gameplay may be evaluated by a server-side service that is in data communication with the computing device that is executing the game application. In at least one example, the user's gameplay may be evaluated by a server-side service and the game application may be streamed to the user from a cloud computing service. In other words, both the game application and the evaluation service may be remote to the user.

The user may receive prompts during gameplay in real-time that an event or object is detected in the user's gameplay that has a social media performance prediction or rating above a threshold value. For example, systems and methods according to the present disclosure may periodically and/or substantially continuously evaluate social media posts for comparison videos, and the evaluation system or service may notify a user when a similar event or object is identified in the user's gameplay. In some embodiments, the user is presented with an option to record and/or post the identified event. In some embodiments, a video clip, screen capture, or recording is automatically saved, and the user is notified and/or prompted to post the saved video clip, screen capture, or recording.

In some embodiments, the user's gameplay is recorded and subsequently evaluated (e.g., object and/or events detected and/or identified). For example, the user's gameplay may be evaluated by a local software application that obtains and evaluates a recording of the user's gameplay. In another example, the user's gameplay may be evaluated by a server-side service that is in data communication with a computing device having a recording of the user's gameplay stored thereon. In at least one example, the user's gameplay may be evaluated by a server-side service and the game application may be recorded from a cloud computing service.

Upon subsequent evaluation of the recorded user's gameplay, any events and/or objects identified that are similar to events and/or objects of comparison videos and/or have a social media performance prediction or rating above a threshold value are surfaced to the user. In some embodiments, the user is presented with an option to record and/or post the identified event. In some embodiments, a video clip, screen capture, or recording is automatically saved, and the user is notified and/or prompted to post the saved video clip, screen capture, or recording.

In some embodiments, the detection and identification of events is assisted by the machine vision and/or machine learning (ML) system invoking an application module. In some embodiments, the application module is created by a machine learning system through training datasets. For example, a machine learning system may evaluate many events to determine correlations between events across many video streams or recordings. In some embodiments, the application module is a predetermined application module based on the game engine of the game application to inform the system what events, objects, or animations are rendered in the game engine. For example, the application module may provide an example user avatar model, object textures, weapon models, health pack models, victory animations, user interface information, etc.

The application module may be specific to the game application, as the art style, animation style, or textures used in a first game application can be very different from a different game application. Furthermore, storing all possible textures, models, animations, and events for a plurality of game applications in memory and searching for those objects and events in the video information may be inefficient, when the video information may only include video information from a single game application at a time. In at least one example, a competitive electronic game player may practice the electronic game League of Legends for 8-10 hours in a day, while recording the video information from the practice session. It is more efficient to invoke an application module for League of Legends, specifically, when evaluating and querying the video information later, as compared to attempting to detect and identify objects and events using machine vision data also including textures, models, animations, and events encompassing other games such as Fortnite, Super Smash Bros., Street Fighter, and Forza Motorsport.

In some embodiments, the application module may include or assist a machine vision system in identifying graphical textures in the video information provided from the client device. In some embodiments, the application module includes game characteristics specific to the game application being run by the client device. In some embodiments, the game characteristics include textures, models, animations, UI elements, sounds, or other visual or audible features from the game. For example, the application module may include texture files that provide a unique texture that is used in the game to skin a particular item in the game environment. In at least one example, a boss character at the end of a level in the game environment may have a unique appearance in the game, and the machine vision system may access the application module to identify the character or event based on the texture used to skin the model. In some examples, a level or area of the game environment may include a unique texture or combination of textures on surfaces in the game environment. For example, a particular castle level may use a unique texture for the stone walls of the castle, allowing the machine vision system to identify portions of the video information when the playing user is within that portion of the game environment.

In some embodiments, the application module includes a model or sprite that is used in the game environment to depict a particular character or class of characters. The application module can include both volumetric models used to depict a three-dimensional avatar or object in the game environment, a three-dimensional skeleton model used to provide proportions over which a volumetric model is positioned and animated, two-dimensional sprites or skeletons, or combinations thereof. The models can allow the machine vision system to more readily detect and/or identify objects and avatars in the video information depicting the game environment.

In some embodiments, the application module includes animation information allows the machine vision system to identify common movements in the video information depicting the game environment. For example, some games allow customization of user avatars, which allow each user avatar to include different textures, sizes, proportions, or other variations to their appearance in the game environment. Some animations, such as emotes, attacks, or jump animations may produce similar movements of objects or portions of the avatar relative to one another. In at least one example, Fortnite includes a variety of dance animations that, while performable by avatars using different sizes, proportions, colors, textures, models, equipable cosmetic objects, or even representing species, move the avatars' limbs relative to the body in the same manner. The resulting animation may be recognized by the machine vision system independently of the model or textures used to represent the animation in the video information depicting the game environment.

User interface (UI) elements are present on the video information independently of the objects, perspective, or actions occurring in the game environment. In some embodiments, the application module includes UI elements that the machine vision system uses to interpret information provided by the UI to the user. For example, the UI elements can provide various information about the status of the game or game environment, such as user avatar information, game time information, team information, score, health, mana, lives, eliminations, equipment, powerups, abilities, cooldowns, etc. The UI elements can allow the machine vision to identify different stages or sections of a gameplay session in the video information. In some embodiments, optical character recognition allows the machine vision to identify specific characters, numbers, values, words, or other notifications in the user interface.

In some embodiments, a ML model or system communicating with the machine vision system can interpret the detected textures, models, animations, or combinations thereof as various events in a gameplay session to be surfaced to a viewer of the video information. For example, an enemy elimination event may be detected by a UI element incrementing, by an elimination animation detected in the user avatar, an elimination animation detected in an opposing avatar, by a splash screen or UI banner element announcing the elimination, or by other visual cues. The detection of at least one of the foregoing may allow the system to identify the event as an elimination event.

Some embodiments of systems and methods according to the present disclosure may access the application module to identify key events in the video information depicting a game environment and/or a gameplay session to be surfaced to a viewer of the video information. In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience.

While some embodiments of systems and methods for present video information to a user evaluate only video information, some embodiments evaluate other forms of information or data to supplement the video information. In some embodiments, the video information obtained from a client device further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information obtained from the client device includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, the application module includes information related to at least one of key events, popular events, rare events, exploit events, or other virtual objects in the game application. The ML system can evaluate comparison videos obtained from one or more social media platforms to associate a social media performance ratings with one or more of the key events, popular events, rare events, exploit events, or other virtual objects in the game application. In some embodiments, the social media performance ratings are periodically or substantially continuously updated based on the performance of recordings, streams, screen captures, or other video information on the social media platform(s). For example, the social media performance ratings may be updated periodically or substantially continuously based on the most viewed clips for the associated game application within a particular time period. In a first example, the social media performance ratings are updated daily based on the 50 most viewed clips for the associated game application posted or uploaded within the previous 24 hours. In a second example, the social media performance ratings are updated substantially continuously based on the 500 most viewed clips for the associated game application posted or uploaded within the previous week. In a third example, the social media performance ratings are updated weekly based on the 1000 most viewed clips for the associated game application posted or uploaded within the previous month.

In some embodiments, an ML system may allow for the development of an application module for unknown game applications and/or the refinement of application modules for known game applications. For example, while an application module may be provided for a game application with a broad install base, some game applications may have a smaller install base and the creation of a dedicated or predetermined application module may not be desirable. In some embodiments, an existing application module may be refined over time using an ML model to update the application module or other ML model data with new strategies, new movesets, new characters, new stages, new items, or newly popularized techniques and strategies. For example, updates to existing game applications may utilize existing application modules for the UI elements, textures, models, and animations, along with existing key events, popular events, rare events, or combinations thereof while adding new content. The ML model allows the new content to be identified as new UI elements, textures, models, and animations. Upon detecting the new UI elements, textures, models, and animations repeatedly, the ML model may reclassify the detected new UI elements, textures, models, and animations as key events, popular events, rare events, etc. as those elements are detected more frequently and in particular contexts in the video information depicting the game environment.

Generally, systems and methods according to the present disclosure can assign social media performance ratings to the video information based on the presence and/or proximity of the detected and identified elements. In some embodiments, the key events are associated with tags and social media performance ratings that identify them as key events and associate the key event with any number of contextual tags. For example, an elimination banner in the UI may be detected by the machine vision and/or ML model of the system and identified as a key event. The key event is also assigned tags indicating that the key event is an opponent elimination, was performed with a sniper rifle, was performed while scoped, and was performed at 10 minutes and 31 seconds into the match.

In some embodiments, each tag is assigned an associated social media performance rating. For example, the comparison video(s) may include a high number of elimination key events, but elimination key events using a particular weapon, at a particular location, against a particular opponent, etc. may be associated with a greater quantity of views and/or greater social media engagement. The tags and/or the specific variant of the elimination key event may have a greater social media performance rating assigned thereto than an elimination key event with other tags, weapon, location, opponent, etc.

The system and/or methods for evaluating the events and/or objects of the user's video information may further provide suggested descriptions and/or descriptors of events and/or objects detected in the video information. In some embodiments, the system and/or method suggests the descriptions and/or descriptors upon suggesting capturing the video information. In some embodiments, the system and/or method suggests the descriptions and/or descriptors upon the user choosing to share or post the video information as content to a social media platform.

In some embodiments, a description for the video information is at least part of a caption provided with the video information when shared or posted to a social media platform. In some embodiments, a description for the video information is at least part of metadata for the video information provided with the video information when shared or posted to a social media platform. In some embodiments, a description for the video information includes one or more descriptors. In some embodiments, a description for the video information is at least part of a text appended to or overlaid on the video information when shared or posted to a social media platform. For example, the description may be displayed in the frame of the video information during viewing by a viewer.

In some embodiments, a description includes one or more descriptors. A descriptor is a specific term that is related to an event or object in the video information. In some embodiments, the descriptor is associated with an object detected in the video information. In some embodiments, the descriptor is associated with an event detected in the video information. In some embodiments, the descriptor is part of a description, such as part of the grammatical syntax of the description. In some embodiments, the descriptor is a standalone term, such as in a list provided after the description. In some embodiments, the descriptor is at least part of metadata for the video information provided with the video information when shared or posted to a social media platform. In at least one embodiment, the descriptor is provided as a queryable hashtag provided with the video information when shared or posted to a social media platform.

In some embodiments, a description and/or descriptor is at least partially based on the location (e.g., social media platform, club within a social media platform, channel within a social media platform, account under which the content is shared to the social media platform) to which the user's gameplay is posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In a specific example, the suggested description and/or descriptors may be different when sharing the content to the XBOX social media platform than when sharing the content to the YouTube social media platform.

In other examples, the social media performance rating may be based at least partially on a club, group, or subgroup within a social media platform. For example, the social media performance rating presented to the user may be relative to the social media performance of similar clips or events within a club, group, or subgroup. While a particular event captured in the user's gameplay may have little broad appeal on a general use video sharing platform, a video game console-specific video sharing platform may provide a more focused audience, while a game-specific sharing platform (such as a game-specific club on a video game console-specific video sharing platform) may allow the post to experience even greater engagement. In a specific example, the suggested description and/or descriptors may be different when sharing the content to a specific club, group, or subgroup, as specific terminology may be favored or disfavored within the community.

In some embodiments, a system for surfacing electronic gaming video information to a user includes a client device and a server computer in communication via a data network. The system includes a client device and a server computer in communication via a data network. In some embodiments, the client device is a computing device with a processor and hardware storage device in communication with the processor. In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device is local to and/or integrated with the client device 102. In some embodiments, the hardware storage device is accessed by the client device through a network connection.

The processor may execute a game application that is stored on the hardware storage device to render video information at least partially in response to user inputs to the client device. In some embodiments, the client device includes a display device to display the video information to a playing user. For example, the client device may be a dedicated gaming console with an integrated display (e.g., NINTENDO SWITCH) or a general-purpose computer with an integrated display (e.g., a laptop computer). In some embodiments, the client device is in communication with a display device to display the video information to a playing user. For example, the client device may be a gaming console (e.g., MICROSOFT XBOX) that outputs the video information to a connected display device (e.g., a television) for display to a playing user.

In some embodiments, the video information or a portion of the video information is also transmitted to a server computer via a data network. In some embodiments, the server computer is located remotely from the client device and the data network is or includes the World Wide Web. For example, the client device may be connected to the data network via the playing user's home internet connection, and the server computer may be located in a datacenter. In some embodiments, the server computer is located locally to the client device 102 and the video information is transmitted over a local area network or a direct data connection. For example, a competitive electronic game tournament (e.g., an eSports competition) may have a local data network 106 to which all client devices used for the competition are connected. A server computer connected to the local data network may communicate with the client devices used for the competition.

In some embodiments, the server computer receives the video information from the client device via the data network. The server computer includes a processor and a hardware storage device in data communication with the processor. The hardware storage device has instructions stored thereon that, when executed by the processor, cause the server computer to perform any of the methods described herein. For example, the server computer may detect events in the video information to classify different events and/or objects based on identified textures, models, animations, or other criteria.

In at least one embodiment, the server computer includes or is in communication with a machine learning (ML) model that detects and/or reports events in the video information to evaluate the video information and identify and tag events. In some embodiments, the server computer has stored thereon (e.g., in the hardware storage device) a ML model that accesses and/or communicates with ML model data. In some examples, the ML model data is stored locally to the server computer. In some examples, the ML model data is stored remotely from the server computer and accessed by the server computer via the data network. For example, the ML model data may be aggregated from and/or refined by a plurality of ML models executed by a plurality of server computers. The ML model data may be updated based on the outputs of the ML models, with the most current ML model data made available for the ML model running on the server computer when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, a UI element indicating player avatar health may increase in value in response to the player avatar interacting with a health pack in the game environment.

In some embodiments, the ML system can create an application module of expected or correlated events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games including Rocket League or FIFA). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined. In some embodiments, the application module is developed and refined by the ML system by iterations of processing video information.

The system further includes a social media platform. In some embodiments, the server computer and/or the ML model accesses the social media platform to obtain the comparison video(s). The comparison video(s) includes at least video information and, in some embodiments, additional information such as audio information, user input data, game state data (including game application, game mode, player level, etc. represented in the video), video and/or post metadata (such as the posting user; upload date; post title; or video/post properties such as length, resolution, frame rate, bitrate, etc.), or other information related to the recorded gameplay. The comparison video further includes social media metrics that are related to the social media performance of the comparison video(s). In at least one example, the most viewed comparison video on the social media platform associated with the game application has 14,000 views, 9,500 likes, 300 comments, and has been reshared times. In some embodiments, social media performance values are assigned to one or more of the social media metrics.

The server computer and/or the ML model evaluates the comparison video to identify one or more events and/or objects that can be associated with the social media metrics. Systems and methods according to the present disclosure parse the video information by detecting objects in frames of the video information. In some embodiments, the objects include virtual objects positioned in the game environment. The video information may reflect the player avatar, such as a car, moving within a three-dimensional or two-dimensional game environment, where the position of the virtual object is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar relative to the overall game environment and/or depending on the movement of the virtual object relative to the game environment.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In some embodiments, a frame of video information includes an object (e.g., a tree) positioned in the game environment with the player avatar, in this case a car. Other objects in the frame include the user interface which may be independent of the three-dimensional game environment. The machine vision may identify the position, size, and shape of the tree object relative to the player avatar to determine relative position of the object and the avatar in the game environment. By evaluating the relative position of the object and the avatar in one frame or a sequence of frames (adjacent frames at the native framerate or non-adjacent key frames), the machine vision and/or ML system may identify a crash between the car and the tree. The crash may be identified as a key event and denoted as such relative to the social media metrics.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI. In other examples, a detected object that increases in size differently than the other objects in the game environment may be moving relative to the game environment. In some embodiments, a crash key event may be identified by a change in the UI depicting the speedometer rapidly and/or suddenly decreasing in value. For example, a rapid change in the UI reflecting a change in speed of the car avatar from 150 kilometers per hour (kph) to 0 kph in under 1.0 seconds may be identified as a crash.

A virtual object, as used herein, may include any object or element rendered or presented by the client device in the process of running the game application. For example, a virtual object may be an element of the UI. In some examples, a virtual object may be a player avatar. In some examples, the virtual object may be wall, floor, or other geometry of the game environment such as a tree object. In some examples, the virtual object may be an interactive or movable object within the game environment, such as a door, crate, or power-up.

In some embodiments, the machine vision and/or ML model can identify objects in the game environment without explicit training to identify the object. For example, a machine vision system that includes ML may learn to identify tree objects within the game environment, even if the particular model of tree object has not been explicitly taught to the machine vision system. In at least one example, systems and methods according to the present disclosure may be portable between video information from a variety of game applications where different models for common objects, such as tree object, are used. By training the ML model, the machine vision may be able to recognize and detect tree object in the video information. In some examples, elements of the game environment are procedurally generated. A series of procedurally generated tree objects may include common elements but be distinct models from one another, as rendered in the video information. Therefore, an explicitly provided model would be inapplicable to procedurally generated tree objects.

In some embodiments, the machine vision system invokes an application module that is associated with the game application that is the source of the video information. Art styles can vary considerably between game applications. Even a ML model that has been trained on video information from a plurality of game applications to detect tree objects may fail when presented with a new art style. For example, while both Fortnite and Call of Duty are competitive first-person shooter games, the appearance of objects is very different between the games. Specifically, tree objects and other elements of the game environment appear very different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

The social media metrics of the comparison video(s) obtained from the social media platform (e.g., "likes", shares, comments, views, saves, or other social media metrics) may be reported to the ML model and/or ML model data to further refine the ML model based on other user's reactions to the events and/or the associated tags. For example, a clip published to social media showing an elimination performed at very low resource levels in League of Legends may spur greater social engagement than a single elimination performed with high resource levels. The ML model may, therefore, refine and train over time to identify and/or highlight events which are correlated to high levels of social engagement on social media. Upon detection and identification of similar or the same events in user's gameplay, a system or method according to the present disclosure suggest or prompts the user to post a recording of the event on the same or other social media platform.

In some embodiments, a method of presenting electronic game video information is performed at a server computer. The method includes obtaining a comparison video including a plurality of frames. In some embodiments, the method can be performed on any source of video information from a game application, such as gameplay recordings, recreated renderings of a gameplay session based on game state data, or from live streams of the gameplay. For example, obtaining the comparison video may include obtaining the video information in real-time as the comparison video is generated by the processor(s) of the client device (e.g., during live streaming of gameplay). In some examples, obtaining the comparison video includes accessing a recording of the comparison video that was generated by the processor(s) of the client device after the fact, such as from archived gameplay recordings and/or game state data posted on a social media platform. In some examples, obtaining the comparison video includes downloading a video recording from a social media platform.

The method includes evaluating at least one frame of the plurality of frames of the video information at to identify a virtual object, texture, model, or animation. After identifying the virtual object, texture, model, or animation in the frame, the method includes determining a presence of at least one event associated with the detected element.

The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

In some embodiments, the determining the presence of at least on event in the video information includes comparing the detected object, texture, model, or animation to one or more events of an application module. As described herein, the objects, textures, models, or animations of the application module may be predetermined or may be generated by a ML system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience, which may result in greater social media value.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold. In some embodiments, the social media value is at least partially related to the rarity of the rare event. For example, the social media value may be greater for a rarer event, as a rare event is more likely to generate engagement on social media.

While some embodiments of systems and methods for presenting video information to a user evaluate only video information, some embodiments evaluate other forms of information or data to supplement the video information. In some embodiments, the comparison video obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

The method further includes obtaining social media metrics for the comparison video(s). In some embodiments, the social media metrics include views, likes, comments, replies, saves, reshares, etc. The social media metrics include any metrics by which engagement and/or consumption of the posted comparison video are measured.

In some embodiments, at least one event, object, or tag is identified in the comparison video, and the presence of the at least one event, object, or tag is assigned a social media value based at least partially upon the social media metrics of the comparison video and at least one property of the event.

In some embodiments, the property of the event includes any of the described types of events or other types of events. In some embodiments, the property of the event includes any of the described types of metadata. In some embodiments, the property of the event includes any of the described types of tags associated with the event. The property of the event and/or properties of other events or objects in the video information may modify the social media value of the event(s).

In some embodiments, a plurality of identified events within a preset temporal proximity to one another may be recorded or reported to the user as an event amplitude. For example, a particular point in the video information or a portion of the video information with a high density of events may indicate a particularly climatic moment or sequence in the video information. The high density of events may be of particular interest to a viewer or social media users, and the temporal proximity of the events may be assigned an additional or multiplied social media value.

The method, in some embodiments, further includes obtaining user's gameplay including a plurality of frames. In some embodiments, obtaining the user's gameplay includes obtaining the plurality of frames in real-time as the user's gameplay is rendered or generated by the computing device executing the game application. For example, obtaining the user's gameplay may include obtaining the gameplay from the computing device executing the game application. In other examples, obtaining the user's gameplay may include receiving a live stream of the user's gameplay from the computing device executing the game application.

In some embodiments, obtaining the user's gameplay includes accessing a recording of the user's gameplay. In some examples, the recording includes the video information, audio information, user input data, game state data, or other information that can be used to view or recreate the original user's gameplay.

The method further includes determining a presence of the at least one event in the user's gameplay. It should be understood that, while the presently described embodiment of the method refers to a single event, in other embodiments, systems and methods according to the present disclosure are evaluating the user's gameplay for a plurality of events at any given time. For example, the user's gameplay may be evaluated for the presence of elimination events, round victory events, match victory events, point capture events, scoring events, defense events, building events, or any other identified key event, popular event, rare event, exploit event, etc.

Determining a presence of the at least one event in the user's gameplay may be performed according to any of the described methods used to determine the presence of the at least one event in the comparison video(s). In some embodiments, the same ML system, ML model data, application module, or combination thereof used to determine the presence of the at least one event in the comparison video(s) are used to determine the presence of the at least one event in the user's gameplay. In other embodiments, a different ML system, ML model data, application module, or combination thereof is used. For example, the ML model data may be revised and/or updated using a more processor-intensive first ML system used to evaluate the comparison video(s) while a second ML system is run locally on the computing device that executes the game application to evaluate the user's gameplay in real-time. Because the local computing device may have less computational resources than a server computer (or server computers), the first ML system and second ML system may be different.

The method, in some embodiments, further includes presenting to the user a social media performance rating of the user's gameplay associated with the at least one event based at least partially upon the social media value of the at least one event. In some embodiments, the social media performance rating of the user's gameplay presented to the user is a total of all detected events in the user's gameplay. For example, in a 60 second recording, three events may be detected and a total rating of the three events is presented to the user. In some embodiments, the social media performance rating is presented on a numerical scale, such as 1 to 100. In some embodiments, the social media performance rating is a letter grade, such as F to A+. In some embodiments, social media performance rating is a sum of the social media values of a plurality of events, such as a nominal total.

In some embodiments, the social media performance rating is calculated for an individual event, such as during real-time analysis of the user's gameplay. In such examples, a detected event in the user's gameplay may be noted and surfaced to the user with a social media performance rating for the event, such as a round-winning goal being detected as a key event and presented to the user with a social media performance rating of 25 out of 100. In some embodiments, a plurality of events are detected and presented to the user as a single sequence of events with a social media performance rating. For example, the round-winning elimination described previously may be the final event in a sequence including three other eliminations while the user's avatar was low on resources, such as health, energy, mana, ammunition, cooldowns, etc. Such as sequence may be presented to the user with a total social media performance rating for the plurality of events detected in the sequence.

In some embodiments, detecting an event in the user's gameplay may begin a timer. The timer allows any subsequent detected events to be associated with the first event in a sequence. For example, a single elimination detected in the user's gameplay in a MOBA may begin a 3 second timer, a 5 second timer, a 10 second timer, or timer of other duration. Additional event(s) (such as additional eliminations) detected within the timer may add the additional event(s) to the sequence. Additional events(s) may reset or further extend the timer to allow the detection and addition of still more events. Upon expiration of the timer, the sequence is presented to the user with a social media performance rating. In some embodiments, the sequence is presented as a suggested capture or suggested post, in addition to the social media performance rating.

In some embodiments, a plurality of detected events is presented to the user with the total social media performance rating of the plurality of detected events, as described. In other embodiments, the plurality of detected events is presented to the user with a social media performance rating that is based on a modified social media value of the plurality of detected events. In some embodiments, a multiplier is applied to the sum of the social media performance rating of the plurality of detected events. For example, a single elimination may have a social media value of 10 points, while each elimination increases a multiplier coefficient by 0.1. In such an example, a sequence of two eliminations is scored as 1.1*(10+10), and a sequence of 5 eliminations is scored as 1.4*(10+10+10+10+10).

In some embodiments, the multiplier is linear. In other embodiments, the multiplier is nonlinear. In some embodiments, the multiplier is based at least partially on the temporal proximity of the detected events. For example, the closer in time the events occur, the greater the multiplier. A sequence of two eliminations that occur 5 seconds apart may be assigned a lesser social media performance rating than a sequence of two eliminations 1 second apart.

In some embodiments, the multiplier is based at least partially upon the source of the event. For example, a detected event that is performed by the user's avatar in the user's gameplay may be assigned a greater social media performance rating than a detected event performed by a second user's avatar in the user's gameplay. In a particular example, a unique or exciting combo in a fighting game application that is performed by the user may be assigned a first social media performance rating for the user's gameplay compared to the same unique or exciting combo in the fighting game application when performed by an opponent against the user in the user's gameplay. While the detected combo has an assigned social media value based at least partially on evaluations of comparison videos, the detected combo may have less social media performance rating for the user when the user is the receiving character of the combo.

In some embodiments, one or more social media performance ratings are presented to the user based on the social media platform to which the user's gameplay may be posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In other examples, the social media performance rating may be based at least partially on a club, group, or subgroup within a social media platform. For example, the social media performance rating presented to the user may be relative to the social media performance of similar clips or events within a club, group, or subgroup. While a particular event captured in the user's gameplay may have little broad appeal on a general use video sharing platform, a video game console-specific video sharing platform may provide a more focused audience, while a game-specific sharing platform (such as a game-specific club on a video game console-specific video sharing platform) may allow the post to experience even greater engagement.

In some embodiments, presenting to the user a social media performance rating of the user's gameplay associated with the at least one event based at least partially upon the social media value of the at least one event includes presenting a notification in the user interface of the game application or at a computing device shell- or OS-level independent of the game application in real-time during gameplay. For example, the notification may inform the user with a visual representation of the detected event(s) and a social media performance rating thereof. In some embodiments, the notification includes a suggestion to capture the detected event(s) for later posting. In some embodiments, the notification includes a suggestion of a clip length to capture the detected event(s).

In other embodiments, the method includes automatically capturing the detected event(s) and the notification informs the user that a clip has been captured along with a visual representation of a predicted social media performance rating of the clip. In some embodiments, the clip is automatically captured when the social media performance rating exceeds a threshold value. For example, a suggestion to capture a clip may be made when an event is detected with a social media performance rating greater than 25 out of 100, while the clip is automatically captured when the calculated social media performance rating for the detected event(s) is greater than 75 out of 100.

A suggestion for capture and/or posting may be based at least partially upon the type of event(s) detected. For example, rare events, exploit events, or other technical occurrences may be of little interest to a social media audience, at large, as a detailed understanding of a game application's game design or game engine may be needed to understand and appreciate the detected events. In a specific example, a series of wave dashes in Super Smash Bros. Melee may be of particular interest to a dedicate community of experienced players, while casual players may not appreciate the technical inputs necessary to accomplish the events in the clip. Such events may be suggested for posting to specialized groups or clubs within a social media platform.

In some embodiments, presenting to the user a social media performance rating of the user's gameplay associated with the at least one event based at least partially upon the social media value of the at least one event includes suggesting one or more clips within the user's gameplay for posting to social media. For example, the method may include providing a visual representation of the identified events in a video editor interface and/or metadata of the user's gameplay that is at least partially based on social media performance ratings.

In some embodiments, the visual representation or visual indicator is a dot, dash, shape, or symbol presented on a UI of the video information editing or viewing software. A frame of the video information may be shown including a representation of the game environment with the player avatar visible holding a map object. The detection of a map object in the possession of the player avatar may indicate a building key event. In some embodiments, a UI element (such as a map) may provide information and/or context to the event, such as the map providing a location in the game environment.

In some embodiments, a video information timeline indicates the temporal location of the frame within the video information. In some embodiments, one or more visual representations of identified events are positioned on or near the timeline to indicate to the user the temporal location of the events in the video information.

In some embodiments, the shape or symbol of the visual representation representing the event on the video information timeline may be unique to the type of event or tags associated with the event. For example, a dot may indicate a key event, a heart may indicate a popular event, and a diamond may indicate a rare event. In some examples, different key events may have different symbols or visual representations associate with the key events, such as an "X" symbol indicating a player elimination key event, a crosshair indicating an opponent elimination event, a cross indicating a healing key event, a checkered flag indicating a round end, etc. Each of these events or sequences of events has a social media value or social media performance ratings associated therewith.

In some embodiments, the visual representation is associated with a single detected event. The visual representation, in some embodiments, includes a social media value for the detected event. For example, the visual representation may be or include a numerical value. In other examples, the visual representation may be or include a letter value. In yet other examples, the visual representation may display the social media value in an alternative text, a submenu, or other secondary display of the visual representation. In a specific example, a player elimination event has a visual representation that is an X, and when the user places a cursor over the X, a numerical social media value is displayed.

In some embodiments, the visual representation is associated with a plurality of detected events in a sequence. The visual representation may be associated with a plurality of detected events. For example, the visual representation may highlight a portion of the timeline in which the sequence of detected events occurs. In other examples, a visual representation is assigned to each of the detected events in the plurality of detected events, and when a user places a cursor over a visual representation of any detected event in the sequence, the visual representations of each detected event in the sequence becomes highlighted to indicate the complete sequence.

The visual representation(s), in some embodiments, includes a social media performance rating for the sequence of detected events. For example, the visual representation may be or include a numerical value. In other examples, the visual representation may be or include a letter value. In yet other examples, the visual representation may display the social media performance rating in an alternative text, a submenu, or other secondary display of the visual representation. In a specific example, a sequence of detected events is assigned a social media performance rating for the complete sequence, and the visual representation of each detected event includes a social media value for that event, while the social media performance rating for the complete sequence is also displayed. Therefore, a user can review the social media values for each event and also see how each event in the sequence contributes to the social media performance rating of the sequence.

In some embodiments, the visual representation is a list of timestamps, such as a table of contents or chapter list, which allows a user to link to the associated temporal location in the video information. In some embodiments, each event in the list of timestamps has a symbol, text tag, or other visual representation associated with the event to present to the user easily differentiated and recognizable links to the events in the video information. In at least one embodiment, one or more events are automatically selected and surfaced to the user as high priority events. For example, a plurality of events in close temporal proximity may produce an event amplitude above a preset threshold and prompt the video information editing or video information viewing software to present the high amplitude series of events to the user.

In some embodiments, the method is performed at a server computer, either in real-time or on a recording of the user's gameplay. In some embodiments, a method of evaluating video information from an electronic game is performed at the client device or at a recording device local to the client device, which may subsequently be used to upload the video information and/or event information to a data network. While the embodiment of a method will be described in relation to a discrete recording device in data communication with the client device, it should be understood that some embodiments may be performed on the client device, itself. In at least one example, the client device is retail commodity hardware game console, and substantially all computational resources of the processor(s) are dedicated to the execution of the game application stored on the client device. As such, a recording device in communication with the client device may allow for additional computational resources local to the client device without compromising game performance.

In some embodiments, a system includes a recording device in communication with a client device and a data network. A recording device, in some embodiments, includes a hardware storage device in communication with at least one processor. The client device provides video information (and, optionally, user input data, game metadata, and/or game state data) of the user's gameplay to the recording device. In some embodiments, the recording device is connected to a data network to communicate with or access a remote server computer and/or ML model data.

The recording device receives the user's gameplay from the client device and evaluates the user's gameplay for events according to an application module. In some embodiments, the recording device evaluates the user's gameplay according to any of the methods described herein.

In some embodiments, the recording device or client device obtains the user's gameplay produced by execution of a game application on the client device. In some embodiments, the video information is obtained by the client device upon rendering the video information. In some embodiments, the video information is obtained by the recording device by a local data connection to the client device. In some embodiments, the user's gameplay is obtained by the recording device by a local data connection to the client device or by the client device. The method further includes obtaining ML model data from a remote server containing event and/or object information for the game application represented in the user's gameplay and the social media values associated therewith. The ML Model Data may be aggregated from a plurality of ML models or from other client devices, recording devices, or server computers that have evaluated video information from the same or other game applications to refine or expand the ML Model Data. By obtaining ML Model Data from a network source, the client device or recording device local to the client device may benefit from the other ML models and computing devices evaluating comparison videos and social media metrics of the comparison videos to continually refine the detection of events and the social media values of the detected events.

A virtual object, texture, model, or animation may be detected by any of the methods or techniques described herein. For example, detecting the virtual object, texture, model, or animation and determining the presence of at least one event in the video information may include any of the machine vision and/or ML techniques described herein. In some embodiments, the method further includes comparing the detected virtual object, texture, model, or animation to one or more events of an application module based at least partially upon the ML model data to identify the event and determine the presence of the at least one event using the ML model data.

In some embodiments, the application module is created by a machine learning system through training datasets. For example, a machine learning system may evaluate many events to determine correlations between events across many video streams or recordings. In some embodiments, the application module is predetermined based on the game engine of the game application to inform the system of various events, such as key events, popular events, rare events, or any other types of events and refined with the ML Model data.

The method further includes determining a presence of the at least one event in the user's gameplay at. It should be understood that, while the presently described embodiment of the method refers to a single event, in other embodiments, systems and methods according to the present disclosure are evaluating the user's gameplay for a plurality of events at any given time. For example, the user's gameplay may be evaluated for the presence of elimination events, round victory events, match victory events, point capture events, scoring events, defense events, building events, or any other identified key event, popular event, rare event, exploit event, etc.

The method, in some embodiments, further includes presenting to the user a social media performance rating of the user's gameplay associated with the at least one event based at least partially upon the social media value of the at least one event. In some embodiments, the social media performance rating of the user's gameplay presented to the user is a total of all detected events in the user's gameplay. For example, in a 60 second recording, three events may be detected and a total rating of the three events is presented to the user. In some embodiments, the social media performance rating is presented on a numerical scale, such as 1 to 100. In some embodiments, the social media performance rating is a letter grade, such as F to A+. In some embodiments, social media performance rating is a sum of the social media values of a plurality of events, such as a nominal total.

In some embodiments, the social media performance rating is calculated for an individual event, such as during real-time analysis of the user's gameplay. In such examples, a detected event in the user's gameplay may be noted and surfaced to the user with a social media performance rating for the event, such as a round-winning goal being detected as a key event and presented to the user with a social media performance rating of 25 out of 100. In some embodiments, a plurality of events are detected and presented to the user as a single sequence of events with a social media performance rating. For example, the round-winning elimination described previously may be the final event in a sequence including three other eliminations while the user's avatar was low on resources, such as health, energy, mana, ammunition, cooldowns, etc. Such as sequence may be presented to the user with a total social media performance rating for the plurality of events detected in the sequence.

In some embodiments, detecting an event in the user's gameplay may begin a timer. The timer allows any subsequent detected events to be associated with the first event in a sequence. For example, a single elimination detected in the user's gameplay in a MOBA may begin a 3 second timer, a 5 second timer, a 10 second timer, or timer of other duration. Additional event(s) (such as additional eliminations) detected within the timer may add the additional event(s) to the sequence. Additional events(s) may reset or further extend the timer to allow the detection and addition of still more events. Upon expiration of the timer, the sequence is presented to the user with a social media performance rating. In some embodiments, the sequence is presented as a suggested capture or suggested post, in addition to the social media performance rating.

In some embodiments, a plurality of detected events is presented to the user with the total social media performance rating of the plurality of detected events, as described. In other embodiments, the plurality of detected events is presented to the user with a social media performance rating that is based on a modified social media value of the plurality of detected events. In some embodiments, a multiplier is applied to the sum of the social media performance rating of the plurality of detected events. For example, a single elimination may have a social media value of 10 points, while each elimination increases a multiplier coefficient by 0.1. In such an example, a sequence of two eliminations is scored as 1.1*(10+10), and a sequence of 5 eliminations is scored as 1.4*(10+10+10+10+10).

In some embodiments, the multiplier is linear. In other embodiments, the multiplier is nonlinear. In some embodiments, the multiplier is based at least partially on the temporal proximity of the detected events. For example, the closer in time the events occur, the greater the multiplier. A sequence of two eliminations that occur 5 seconds apart may be assigned a lesser social media performance rating than a sequence of two eliminations 1 second apart.

In some embodiments, the multiplier is based at least partially upon the source of the event. For example, a detected event that is performed by the user's avatar in the user's gameplay may be assigned a greater social media performance rating than a detected event performed by a second user's avatar in the user's gameplay. In a particular example, a unique or exciting combo in a fighting game application that is performed by the user may be assigned a first social media performance rating for the user's gameplay compared to the same unique or exciting combo in the fighting game application when performed by an opponent against the user in the user's gameplay. While the detected combo has an assigned social media value based at least partially on evaluations of comparison videos, the detected combo may have less social media performance rating for the user when the user is the receiving character of the combo.

In some embodiments, one or more social media performance ratings are presented to the user based on the social media platform to which the user's gameplay may be posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In other examples, the social media performance rating may be based at least partially on a club, group, or subgroup within a social media platform. For example, the social media performance rating presented to the user may be relative to the social media performance of similar clips or events within a club, group, or subgroup. While a particular event captured in the user's gameplay may have little broad appeal on a general use video sharing platform, a video game console-specific video sharing platform may provide a more focused audience, while a game-specific sharing platform (such as a game-specific club on a video game console-specific video sharing platform) may allow the post to experience even greater engagement.

In some embodiments, presenting to the user a social media performance rating of the user's gameplay associated with the at least one event based at least partially upon the social media value of the at least one event includes presenting a notification in the user interface of the game application or at a computing device shell- or OS-level independent of the game application in real-time during gameplay. For example, the notification may inform the user with a visual representation of the detected event(s) and a social media performance rating thereof. In some embodiments, the notification includes a suggestion to capture the detected event(s) for later posting. In some embodiments, the notification includes a suggestion of a clip length to capture the detected event(s).

In other embodiments, the method includes automatically capturing the detected event(s) and the notification informs the user that a clip has been captured along with a visual representation of a predicted social media performance rating of the clip. In some embodiments, the clip is automatically captured when the social media performance rating exceeds a threshold value. For example, a suggestion to capture a clip may be made when an event is detected with a social media performance rating greater than 25 out of 100, while the clip is automatically captured when the calculated social media performance rating for the detected event(s) is greater than 75 out of 100.

A suggestion for capture and/or posting may be based at least partially upon the type of event(s) detected. For example, rare events, exploit events, or other technical occurrences may be of little interest to a social media audience, at large, as a detailed understanding of a game application's game design or game engine may be needed to understand and appreciate the detected events. In a specific example, a series of wave dashes in Super Smash Bros. Melee may be of particular interest to a dedicate community of experienced players, while casual players may not appreciate the technical inputs necessary to accomplish the events in the clip. Such events may be suggested for posting to specialized groups or clubs within a social media platform.

In some embodiments, presenting to the user a social media performance rating of the user's gameplay associated with the at least one event based at least partially upon the social media value of the at least one event includes suggesting one or more clips within the user's gameplay for posting to social media. For example, the method may include providing a visual representation of the identified events in a video editor interface and/or metadata of the user's gameplay that is at least partially based on social media performance ratings. In some embodiments, the visual representation or visual indicator is a dot, dash, shape, or symbol presented on a UI of the video information editing or viewing software.

In some embodiments, a plurality of clips may be presented to the user as a standalone video file that includes a plurality of events from the video information. In some embodiments, the video file may be automatically generated based on the identified events and tags. In some embodiments, the user may preset one or more parameters to automatically generate a "highlight reel" video file upon the evaluation of a video information. In at least one embodiment, the user may preset one or more parameters to automatically generate a "highlight reel" video file upon the termination of a live video stream. An electronic game streamer, therefor, is able to play the electronic game, broadcast the content in real-time during the gameplay, and, upon completion of the gameplay session and termination of the real-time video stream, have the system automatically create a highlight video file of the streaming session for the user to post online.

When sharing or posting a video clip, a screen capture, or compilation of videos and/or images (such as the automatically generated highlight reel, as described above), a user may be presented with the option to input a text description or caption for the posted content. In some embodiments, a system and/or method according to the present disclosure automatically provides recommended text for the description or caption based on one or more events detected in the content.

In some embodiments, a method providing a suggested description or descriptor for sharing of video information can automatically detect events and objects in the video information and suggest a description or descriptor based on an application module related to the detected objects or events. In some embodiments, a suggested description or descriptor is related to elimination events, round victory events, match victory events, point capture events, scoring events, defense events, building events, or any other identified key event, popular event, rare event, exploit event, etc. The suggested description or descriptor may be obtained from an application module containing information related to the detected event or object in the video information. The suggested description or descriptor may be obtained from the description or descriptor parsed from or detected in comparison videos with similar or the same detected events.

In some embodiments, a description for the video information is at least part of a caption provided with the video information when shared or posted to a social media platform. In some embodiments, a description for the video information is at least part of metadata for the video information provided with the video information when shared or posted to a social media platform. In some embodiments, a description for the video information includes one or more descriptors. In some embodiments, a description for the video information is at least part of a text appended to or overlaid on the video information when shared or posted to a social media platform. For example, the description may be displayed in the frame of the video information during viewing by a viewer.

In some embodiments, a description includes one or more descriptors. A descriptor is a specific term that is related to an event or object in the video information. In some embodiments, the descriptor is associated with an object detected in the video information. In some embodiments, the descriptor is associated with an event detected in the video information. In some embodiments, the descriptor is part of a description, such as part of the grammatical syntax of the description. In some embodiments, the descriptor is a standalone term, such as in a list provided after the description. In some embodiments, the descriptor is at least part of metadata for the video information provided with the video information when shared or posted to a social media platform. In at least one embodiment, the descriptor is provided as a queryable hashtag provided with the video information when shared or posted to a social media platform.

In some embodiments, a description and/or descriptor is at least partially based on the location (e.g., social media platform, club within a social media platform, channel within a social media platform, account under which the content is shared to the social media platform) to which the user's gameplay is posted. For example, a Microsoft XBOX user may experience greater relative interest posting a video clip to the XBOX social media platform than posting to a general use video platform, such as YouTube. In such examples, there is greater competition for social media engagement on YouTube than in a dedicated social media platform of interested users, such as the XBOX social media platform. In a specific example, the suggested description and/or descriptors may be different when sharing the content to the XBOX social media platform than when sharing the content to the YouTube social media platform.

In some embodiments, the method includes obtaining descriptor terms at 780. In some embodiments, the descriptors are obtained from an application module that is accessed by a processor. In some embodiments, the application module is obtained from remote server, such as described in relation to FIG. 1. In some embodiments, the application module is stored locally to the processor, such as on a hardware storage device of a video game console or a general-purpose computer. In some embodiments, the application module with descriptors and/or descriptions is provided by a developer and/or publisher of the application. For example, a game application, such as Destiny, may have an application module provided by the developer of the game application, such as Bungie, or the publisher of the game application, Activision.

In some embodiments, the application module is created by analysis of a plurality of comparison videos. For example, an ML model may access or obtain a plurality of comparison videos from one or more social media platforms or other sources (such as video game review websites) and evaluate the description of the comparison video in relation to the objects and/or events in the comparison video. In at least one example, the comparison video is evaluated based on one or more system or method described herein to detected and identify one or more objects or events in the video. In some embodiments, the method includes recording the descriptor(s) in the application module. In some embodiments, the method includes recording the descriptor(s) in the application module associated with one or more textures, objects, animations, or events.

In some embodiments, the ML model compares the detected objects and/or events of a first comparison video to the detected objects and/or events of a second comparison video. Comparison videos with the same detected objects and/or events may have the respective descriptions thereof compared to one another by the ML model to determine shared descriptors between the first comparison video and the second comparison video. Shared descriptors in the respective descriptions of comparison videos with shared objects and/or events may provide a correlation between the descriptors and the respective objects and/or events.

In some embodiments, the descriptors correlated to the presence of the detected objects and/or events are further ranked or prioritized based at least partially on the social media metrics of the comparison videos. For example, a comparison video with higher social media metrics may be indicative of a greater recognition of and/or interest in the descriptor and/or the detected object or event associated with the descriptor, which leads to greater social media engagement with the comparison video. In other examples, the comparison video with the higher social media metrics may be a more popular channel or account that drives more engagement in the community around the content, and the descriptors used by the popular channel or account may establish community terms for the detected objects and/or events. Using the same descriptors for the detected objects and/or events as comparison videos with high social media metrics may produce greater engagement with the user's video information when shared or posted to a social media platform.

In some embodiments, the application module may be developed by the ML model through evaluation of a plurality of comparison videos and the descriptions thereof to create the application module. In some embodiments, an initial application module is provided to the ML model, and the ML model further refines the application module with descriptors correlated to objects and/or events. In some embodiments, the ML model refines the objects and/or events of the application module, such as described herein. In some embodiments, the ML model refines the descriptors of the application module, such as described herein. In at least one embodiment, the ML model refines both the descriptors and the objects and/or events of the application module.

In some embodiments, the ML model refines the descriptors to add descriptors related to a detected object and/or event. For example, the ML model may evaluate a plurality of comparison videos containing the detected object and/or event and, despite the application module containing a correlated descriptor for the detected object and/or event, determine a new descriptor for the detected object and/or event and add that new descriptor for the detected object and/or event. In doing so, the ML model may refine the application module to include community terms that arise organically in the community for the detected object and/or event in the application (such as a nickname for a character) or genre terms that are adopted from other applications in the genre (such as a generic name for an in-game strategy). In at least one example, the new descriptor is added to the application module in addition to the previous descriptor for the detected object and/or event. In other examples, the new descriptor may replace the previous descriptor in the application module.

The descriptors are, in some embodiments, ranked or prioritized for a detected object or event based at least partially on the social media metrics of comparison video(s). For example, the ML model may determine that a first descriptor and a second descriptor are both correlated to the presence of a detected object or event in comparison videos. The ML model may further determine a social media metric for the comparison videos for those including the first descriptor and for those including the second descriptor. The ML model may refine the application module to include both the first descriptor and the second descriptor, with a higher ranking or priority to suggesting the descriptor with higher social media metrics, or refine the application module to include only the descriptor with the higher social media metric.

In some embodiments, a descriptor is classified as one or more class of terms. For example, a descriptor may be classified as an event term, a mode term, an object term, a genre term, a platform term, a community term, a precise term, or other class of term related to the detected object and/or event. In some embodiments, an event term is a descriptor related to an event in the video information, such as a round victory, an elimination, or a character revival. In some embodiments, event terms include further subclasses for different subclasses of events, such as key events, rare events, popular events, etc.

An object term may be a descriptor related to an object in the video information, such as a particular weapon, pick-up, avatar, etc. present in the video information. In some embodiments, an object or event may be present in a plurality of game modes or conditions, and at least one descriptor of the application is related to a particular game mode. For example, an elimination event may be present in a single-player mode and a multiplayer mode. In other examples, an elimination event may be present in a Team Elimination mode of multiplayer and a Capture-the-flag mode of multiplayer. A descriptor may be associated with the identified mode of the application.

In some embodiments, a game term is a class of descriptor that is not specific to a mode, event, or object, but is a class of descriptor that is correlated to the game application represented in the video information. For example, a game term may be a title of the game application (such as Halo Infinite), a title of the game franchise (such as Halo), or a term that is general to the game application, such as the name of the main character of the game application (such as Master Chief in the Halo franchise).

In some embodiments, a genre term is a class of descriptor that is not specific to a game application, mode, event, or object, but is a class of descriptor that is correlated with a plurality of game applications within a genre of applications. For example, a genre term may be a genre title, such as FPS, MOBA, MMORPG, Football, auto racing, etc. A genre term may be a class of descriptor that facilitates users or viewers discovering new content related to the user's interests, irrespective of the specific game application.

In some embodiments, a platform term is a class of descriptor that is not specific to a game genre, game application, mode, event, or object, but is a class of descriptor that is correlated with a plurality of game applications across a platform for playing the plurality of game applications. In some examples, a platform term is a descriptor related to a hardware platform on which the game application is played, such as XBOX, PLAYSTATION, SWITCH, etc. In some examples, a platform term is a descriptor related to a software platform on which the game application is played, accessed, or obtained, such as XBOX LIVE, XBOX GAME PASS, PLAYSTATION NOW, AMAZON LUNA, GOOGLE STADIA, STEAM, etc. In some examples, a platform term is a descriptor related to a hardware input device by which the game application is played such as XBOX ELITE CONTROLLER, PLAYSTATION VR, HITBOX, etc. In some embodiments, the computing system on which the video information is captured includes the input device and/or peripheral device configuration of the computing system executing the application, and the video information may include the input device and/or peripheral device information in metadata of the video information.

In some embodiments, a community term is a class of descriptor that is associated with the detected object and/or event in the video information and is determined from comparison videos. The community term need not be specific to the game application and may be correlated with a plurality of game applications. In some embodiments, a precise term is a class of descriptor that is uniquely associated exclusively with the detected object and/or event in the video information of a single game application or game franchise. For example, a precise term is associated with the detected object and/or event in the video information and may be provided in the application module by the developer or publisher of the application. In other examples, the precise term is associated with the detected object and/or event in the video information and is determined from comparison videos.

The method further includes evaluating the video information for detected objects and/or events. The user's video information may be evaluated in real-time during gameplay or after the video information is captured (e.g., evaluated afterward and/or off-line). In some embodiments, the user's video information is evaluated for detected objects and/or events by any system or method described herein. The user's video information may be evaluated locally, such as on the computing device running the application, or may be evaluated remotely, such as on a server computer. In examples where the video information is captured, the video information may be evaluated in real-time and/or upon capture and one or more descriptors may be assigned to the metadata of the video information. For example, the captured video information may include one or more descriptors in the metadata of the video file that are correlated with one or more object and/or event in the video information. In at least one embodiment, the metadata includes one or more descriptors, tags, or identifiers that are related to the content which may not be readily detectable from the video information. For example, a timestamp of when the video information was captured, a region of the world or a country in which the user was playing the game application, if the video information was captured during tournament play, ranked play, etc., a username, or other parameters or information of the video information not available from the content of the video information. In some embodiments, the method optionally includes evaluating the metadata of the video information to identify any descriptor previously assigned to the video information.

The method further includes comparing the metadata and/or the detected objects and/or events of the video information to an application module containing a plurality of descriptors associated with the video information. For example, a detected object of the video information may be correlated with a precise term in the application module for that object. In another example, a detected event of the video information may be correlated with a plurality of event terms (which may include community terms and/or precise terms). In yet another example, the metadata may be correlated with one or more mode terms or platform terms.

In some embodiments, the method includes preparing content for sharing/posting to a social media platform by preparing the video information and an associated description and/or descriptor. Preparing the video information includes encoding or compressing the video information according to any method known in the art. Preparing an associated description and/or descriptor, in some embodiments, includes suggesting at least part of a description and/or at least one descriptor for the video information based at least partially on the detected object and/or events of the video information.

A system or method according to the present description may provide to the user a pre-populated suggested description and/or list of descriptors. For example, the suggested description may be an automatically generated description including one or more descriptors to describe the content of the video information. The user may subsequently accept, edit, or delete the suggested description. In other examples, a suggested descriptor list is provided with a series of suggested descriptors that may be presented in a list of hashtags (to facilitate querying by other users) or simply a list of descriptors that function as writing prompts to the user to suggest most-relevant terms for the video information.

In some embodiments, preparing an associated description and/or descriptor includes populating an on-screen or software-based keyboard for the user to write the description with suggested descriptors. For example, an on-screen keyboard may provide a conventional QWERTY layout of individual letters while a plurality of suggested descriptors are also provided on-screen to simplify the on-screen typing and/or function as writing prompts to the user to suggest most-relevant terms for the video information. A user may select a suggested descriptor from the provided list to insert the selected descriptor into the user-generated description.

In some embodiments, preparing an associated description and/or descriptor includes populating a dictionary for spell-check, autocorrect, or autofill for a user-generated (or partially user-generated) description. For example, many descriptors in the application module may be words or alphanumeric sequences that do not exist in conventional dictionaries used for word processing. In at least one example, the game application Halo Infinite includes an event called a "grapplejack". The event term "grapplejack" is not included in conventional dictionaries, but a user may want to include the term in the description for accuracy and for visibility of the content on the social media platform. The descriptors identified in the application module as related to the video information are, in some embodiments, loaded into the dictionary used for the spell-check, autocorrect, or autofill for the user typing the description, allowing and encouraging the proper descriptors for the video information.

In some embodiments, the suggested description and/or descriptors may be modified and/or suggested based at least partially on the sharing location. For example, certain descriptors may be more prevalent or may exist/not exist on different social media platforms, channels, clubs, or accounts within a social media platform. In at least one example, the application module may include a community term that is primarily or exclusively used in a particular club within a social media platform. In some embodiments, the application module includes information related to the frequency and/or social media metrics relative to the use of a descriptor in a particular location.

In some embodiments, a user interface for sharing video information to a social media platform is presented to a user on a display for use with an embodiment of the method described herein. In some embodiments, the user interface includes a frame of captured video information with a description of the video information and/or a title. In some embodiments, the user interface includes at least one suggested description of the video information and/or a suggested title based on an application module in preparation for sharing the video information to a social media platform. In some embodiments, the suggested description and/or suggested title is pre-populated with at least one descriptor.

In some embodiments, the user interface includes a descriptor list including a plurality of selectable descriptors that are insertable into the description. In some embodiments, the descriptor list presents the descriptors in an order based at least partially on a social media performance value of the descriptor. The user may provide a user-generated description and/or title while inserting at least one of the suggested descriptors. In at least one embodiment, a social media performance value or rating is displayed and/or associated with the suggested descriptor. In at least another embodiment, a social media performance rating of the video information post, as a whole (e.g., the video information, current description, and current title), is presented to a user during preparation of the video information for sharing to the social media platform. In some embodiments, the social media performance rating is updated in real-time, as the user makes changes to the description and/or title, to provide a user with feedback as to the prediction of the social media performance of the video information post.

Systems and methods according to the present disclosure may be used to confirm the presences of event or objects described or hashtagged in the description of content posted to a social media platform to limit clickbait. In some social media platforms, it has become commonplace to include a list of hashtags or other descriptors in a caption to drive visibility of a post based on the popularity of the hashtags or other descriptors, even if the content of the video information posted is unrelated to the list of hashtags or other descriptors. In some embodiments, a system or method according to the present disclosure may evaluate the video information to determine the presence of detected objects and/or events and compare the detected objects and/or events to a user-generated description or descriptors. In some embodiments, a system or method may modify, flag, or prohibit a description or descriptor that is determined to be unrelated to the content of the video information.

The present disclosure relates to systems and methods for assisting a user in sharing video information on a social media platform according to at least the examples provided in the sections below:

[A1] In some embodiments, a method of assisting video information sharing includes, at a server computer, obtaining a comparison video including a plurality of frames from a social media platform and determining a presence of at least one event in the comparison video. The method further includes obtaining social media metrics for the comparison video from the social media platform and evaluating a description of the comparison video. The method further includes identifying at least one descriptor in the description correlated to the at least event in the comparison video and recording the descriptor in an application module.

[A2] In some embodiments, the method of [A1] further includes assigning a social media value to the descriptor based at least partially on the social media metrics of the comparison video.

[A3] In some embodiments, the method of [A1] or [A2] further includes identifying a plurality of descriptors of the comparison video and assigning a social media value to each event of the plurality of descriptors based at least partially on the social media metrics of the comparison video.

[A4] In some embodiments, the comparison video of [A1] is obtained from a list of trending posts on the social media platform.

[A5] In some embodiments, the comparison video of [A1] is obtained from posts uploaded within a predetermined time period.

[A6] In some embodiments, the method of any of [A1] through [A5] includes obtaining a user's gameplay including a plurality of frames and determining a presence of the at least one event in the user's gameplay.

[A7] In some embodiments, the method of [A6] includes suggesting to the user the at least one descriptor associated with the at least one event.

[A8] In some embodiments, the method of [A7] includes presenting to the user a social media performance rating of the descriptor.

[A9] In some embodiments, presenting to the user a social media performance rating of the descriptor in [A7] further includes presenting to the user a social media performance of the user's gameplay with the descriptor in a description of the user's gameplay.

[A10] In some embodiments, suggesting at least one descriptor in [A7] includes suggesting a description for the user's gameplay.

[B1] In some embodiments, a method of assisting video information sharing includes obtaining a plurality of descriptors, where each descriptor of the plurality of descriptors is correlated with at least one object or event, and evaluating video information for detected objects and/or events. The method further includes comparing the detected objects and/or events of the video information to the plurality of descriptors. The method further includes preparing the video information for sharing to a social media platform and suggesting at least one descriptor for the video information based at least partially on the detected object and/or events of the video information.

[B2] In some embodiments, obtaining the plurality of descriptors in [B1] includes accessing an application module including the plurality of descriptors and a plurality of events correlated to the descriptors.

[B3] In some embodiments, the plurality of descriptors of [B1] or [B2] includes at least community terms.

[B4] In some embodiments, the plurality of descriptors of any of [B1] through [B3] includes at least precise terms.

[B5] In some embodiments, the plurality of descriptors of any of [B1] through [B4] have social media values associated therewith.

[B6] In some embodiments, suggesting at least one descriptor for the video information of any of [B1] through [B5] includes pre-populating a description in a user interface with the at least one descriptor.

[B7] In some embodiments, suggesting at least one descriptor for the video information of any of [B1] through [B6] includes pre-populating a title in a user interface with the at least one descriptor.

[B8] In some embodiments, suggesting at least one descriptor for the video information of any of [B1] through [B7] includes pre-populating a selectable descriptor list in a user interface with the at least one descriptor.

[B9] In some embodiments, suggesting at least one descriptor for the video information of any of [B1] through [B8] includes loading a dictionary for a description, wherein the dictionary includes the at least one descriptor.

[C1] In some embodiments, a method of assisting video information sharing includes obtaining a comparison video including a plurality of frames from a social media platform and determining a presence of at least one event in the comparison video. The method further includes obtaining social media metrics for the comparison video from the social media platform, determining at least one descriptor correlated to the at least one event, and assigning a social media value to the at least one descriptor based at least partially on the social media metrics. The method further includes obtaining a user's gameplay including a plurality of frames, determining a presence of the at least one event in the user's gameplay, and presenting to the user a suggested description for the user's gameplay including the at least one descriptor based at least partially on the social media value of the at least one descriptor.

In another aspect, some embodiments include a system having a hardware storage device, a wireless communication device, and one or more processors. The system is configured perform any of the methods described herein.

In yet another aspect, some embodiments of the technology described herein include a computer-readable storage medium for storing computer-readable instructions. The computer-readable instructions, when executed by one or more hardware processors, perform any of the methods described herein.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of suggesting text description during video information sharing, the method comprising:
    at a server computer:
        obtaining a comparison video including a plurality of frames from a social media platform;
        determining a presence of at least one event in the comparison video;
        obtaining social media metrics for the comparison video from the social media platform;
        evaluating a description of the comparison video, wherein the description is a text description caption provided with the comparison video when shared or posted to the social media platform;
        identifying at least one descriptor in the description correlated to the at least one event in the comparison video; and
        recording the descriptor in an application module.

2. The method of claim 1, further comprising assigning a social media value to the descriptor based at least partially on the social media metrics of the comparison video.

3. The method of claim 1, further comprising identifying a plurality of descriptors of the comparison video and assigning a social media value to each event of the plurality of descriptors based at least partially on the social media metrics of the comparison video.

4. The method of claim 1, wherein the comparison video is obtained from a list of trending posts on the social media platform.

5. The method of claim 1, wherein the comparison video is obtained from posts uploaded within a predetermined time period.

6. The method of claim 1, further comprising:
    obtaining a user's gameplay including a plurality of gameplay frames; and
    determining a presence of the at least one event in the user's gameplay.

7. The method of claim 6, further comprising:
suggesting to the user the at least one descriptor associated with the at least one event.

8. The method of claim 7, further comprising:
presenting to the user a social media performance rating of the descriptor.

9. The method of claim 8, wherein presenting to the user a social media performance rating of the descriptor further includes presenting to the user a social media performance of the user's gameplay with the descriptor in a description of the user's gameplay.

10. The method of claim 7, wherein suggesting at least one descriptor includes suggesting a description for the user's gameplay.

11. A method of suggesting text description during video information sharing, the method comprising:
obtaining a plurality of descriptors, wherein each descriptor of the plurality of descriptors is correlated with at least one object or event based on descriptions of a plurality of comparison videos included the at least one object or event, wherein the descriptions of the plurality of comparison videos are text description captions provided with the plurality of comparison videos when shared or posted to the social media platform;
evaluating video information for detected objects and/or events;
comparing the detected objects and/or events of the video information to the plurality of descriptors;
preparing the video information for sharing to a social media platform; and
suggesting at least one descriptor for the video information based at least partially on the detected object and/or events of the video information.

12. The method of claim 11, wherein obtaining the plurality of descriptors includes accessing an application module including the plurality of descriptors and a plurality of events correlated to the descriptors.

13. The method of claim 11, wherein the plurality of descriptors includes at least community terms.

14. The method of claim 11, wherein the plurality of descriptors includes at least precise terms.

15. The method of claim 11, wherein the plurality of descriptors have social media values associated therewith.

16. The method of claim 11, wherein suggesting at least one descriptor for the video information includes pre-populating a description in a user interface with the at least one descriptor.

17. The method of claim 11, wherein suggesting at least one descriptor for the video information includes pre-populating a title in a user interface with the at least one descriptor.

18. The method of claim 11, wherein suggesting at least one descriptor for the video information includes pre-populating a selectable descriptor list in a user interface with the at least one descriptor.

19. The method of claim 11, wherein suggesting at least one descriptor for the video information includes loading a dictionary for a description, wherein the dictionary includes the at least one descriptor.

20. A method of suggesting text description during video information sharing, the method comprising:
obtaining a comparison video including a plurality of comparison frames from a social media platform, wherein the comparison video has a caption associated therewith when posted to the social media platform;
determining a presence of at least one event in the comparison video;
obtaining social media metrics for the comparison video from the social media platform;
determining at least one descriptor correlated to the at least one event, wherein determining the at least one descriptor includes identifying the at least one descriptor in a description of the comparison video correlated to the at least one event in the comparison video, wherein the description is a text description caption provided with the comparison video when shared or posted to the social media platform;
assigning a social media value to the at least one descriptor based at least partially on the social media metrics;
obtaining a user's gameplay including a plurality of gameplay frames;
determining a presence of the at least one event in the user's gameplay; and
presenting to the user a suggested description for the user's gameplay including the at least one descriptor based at least partially on the social media value of the at least one descriptor.

* * * * *